(12) United States Patent
Campagna

(10) Patent No.: US 10,597,939 B2
(45) Date of Patent: *Mar. 24, 2020

(54) WINDOW SHADE SYSTEM USING ADJUSTABLE ANGLE GEAR

(71) Applicant: Crestron Electronics, Inc., Rockleigh, NJ (US)

(72) Inventor: Michael Campagna, Woodcliff Lake, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 570 days.

This patent is subject to a terminal disclaimer.

(21) Appl. No.: 15/268,139

(22) Filed: Sep. 16, 2016

(65) Prior Publication Data
US 2017/0074037 A1 Mar. 16, 2017

Related U.S. Application Data

(60) Provisional application No. 62/219,522, filed on Sep. 16, 2015.

(51) Int. Cl.
*E06B 9/56* (2006.01)
*F16H 55/08* (2006.01)
(Continued)

(52) U.S. Cl.
CPC .............. *E06B 9/56* (2013.01); *E06B 7/096* (2013.01); *E06B 9/42* (2013.01); *E06B 9/50* (2013.01);
(Continued)

(58) Field of Classification Search
CPC ..... E06B 9/56; E06B 9/50; E06B 9/42; E06B 9/68; F16H 1/006; F16H 1/04; F16H 55/0813
(Continued)

(56) References Cited

U.S. PATENT DOCUMENTS 305,714 A 9/1884 Schulze-Berge
642,423 A * 1/1900 Brodie ...................... E06B 9/40
160/113
(Continued)

*Primary Examiner* — Victor L MacArthur
(74) *Attorney, Agent, or Firm* — Crestron Electronics, Inc.

(57) ABSTRACT

An involute gear bracket system includes first and second involute gears. Each includes a circular base and a plurality of gear teeth extending outward from an outer region of a surface and evenly spaced apart from each other along a plurality of locations on the outer region of the surface. The shape of each gear tooth is defined by a varying cross-sectional involute profile, wherein starting from a first involute profile that is in a plane parallel to the surface of the circular base and extending outward from a center of the circular base, each location on the first involute profile is rotated about a corresponding axis while traversing a path defined by a corresponding imaginary ray extending from the center of the circular base to that location, the corresponding axis being tangential to an imaginary circle that encompasses the inner region of the surface and perpendicular to the corresponding imaginary ray. A first bracket is coupled to a first pivot located at a first distance from the central axis of the first involute gear. A second bracket is coupled to a second pivot and rotatable about the second pivot at least within a second range of angles. The first and second pivots are arranged relative to each other and relative to the central axes of the first and second involute gears, respectively, such that the gear tooth of the first involute gear meshes with the gear tooth of the second involute gear at a corresponding angle within a second range of angles.

11 Claims, 28 Drawing Sheets

(51) Int. Cl.
*E06B 7/096* (2006.01)
*E06B 9/50* (2006.01)
*E06B 9/42* (2006.01)
*F16H 1/00* (2006.01)
*F16H 1/04* (2006.01)

(52) U.S. Cl.
CPC ............... *F16H 1/006* (2013.01); *F16H 1/04* (2013.01); *F16H 55/0813* (2013.01)

(58) Field of Classification Search
USPC ...... 160/113, 120, 174 R, 176.1 V; 464/109; 74/412 R
See application file for complete search history.

(56) References Cited

U.S. PATENT DOCUMENTS

| | | |
|---|---|---|
| 1,196,268 A | 8/1916 | Noel |
| 1,499,934 A | 7/1924 | Klein |
| 1,854,586 A | 4/1932 | Hyer |
| 2,316,243 A | 10/1943 | Hubbard |
| 2,346,507 A | 4/1944 | Quinn |
| 2,397,003 A | 3/1946 | Hambelton |
| 3,983,951 A | 10/1976 | Guerra |
| 5,010,940 A * | 4/1991 | Marocco ................... E06B 9/36 160/168.1 R |
| 5,129,275 A | 7/1992 | Park |
| 5,569,090 A | 10/1996 | Hoskins et al. |
| 5,846,135 A | 12/1998 | Hoskins et al. |
| 9,027,441 B2 | 5/2015 | Gewirtz |
| 2004/0159172 A1 | 8/2004 | Barkdoll |
| 2005/0288144 A1 | 12/2005 | Wang et al. |
| 2006/0108080 A1 * | 5/2006 | Garrigues ............. B60J 1/2091 160/370.23 |
| 2010/0043580 A1 * | 2/2010 | Bernier ................... F16H 1/006 74/412 R |
| 2010/0132495 A1 * | 6/2010 | Bernier ..................... F16H 3/42 74/434 |
| 2014/0007722 A1 | 1/2014 | Urgenc |

* cited by examiner

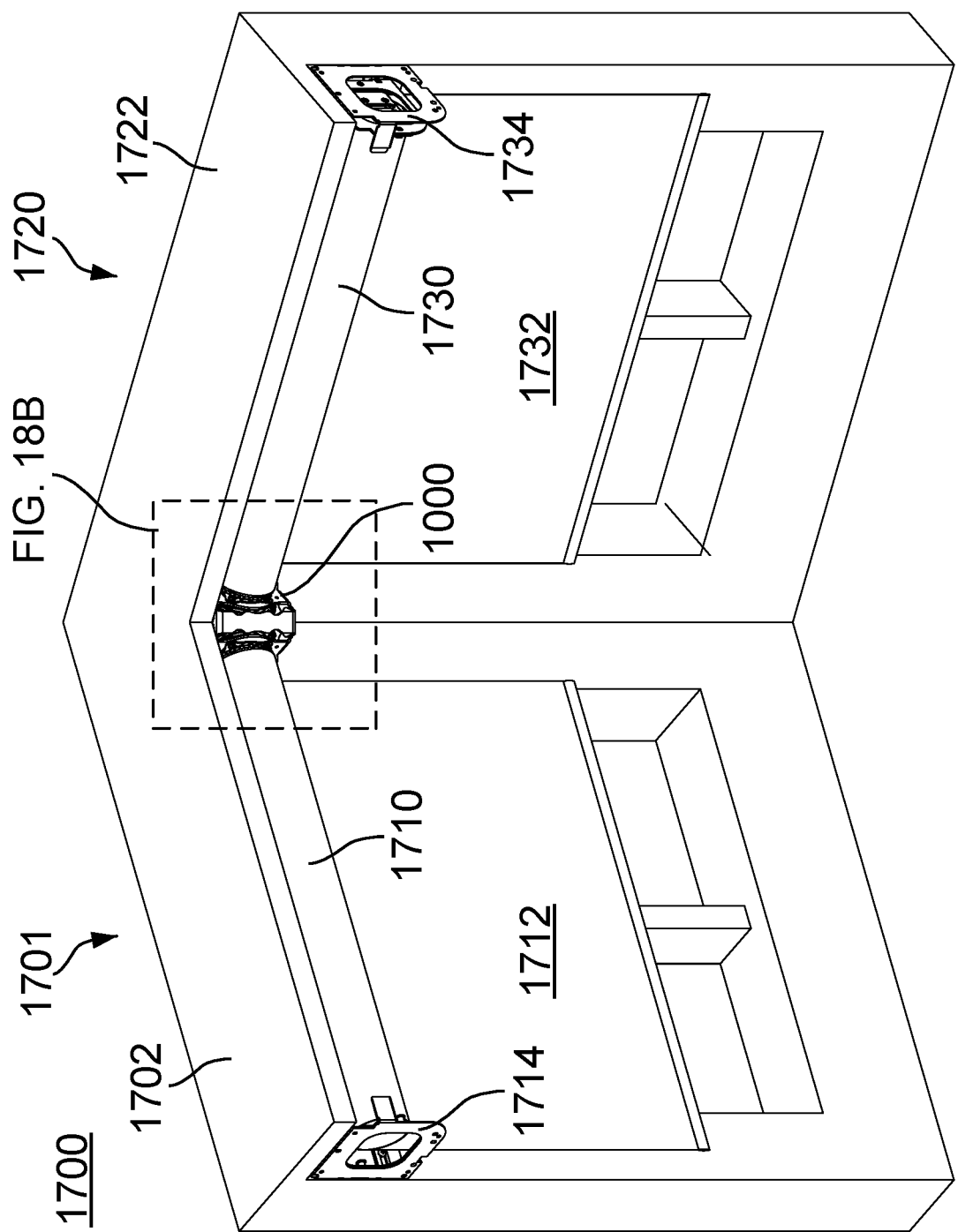

WINDOW SHADE SYSTEM USING ADJUSTABLE ANGLE GEAR

CROSS-REFERENCE TO RELATED APPLICATIONS

This application claims the benefit of the filing date of U.S. Provisional Patent Application No. 62/219,522, filed Sep. 16, 2015, the disclosure of which is incorporated herein by reference.

BACKGROUND OF THE INVENTION

Technical Field

The present embodiments relates to window shading and, more particularly, to window shading systems that incorporate gearing such as involute type gears.

Background Art

In many applications, motor driven window roller shades typically need to be placed with the end of one shade close to the end of another shade to avoid having gaps that can permit light to enter. Therefore, instead of driving each roller shade with its own motor, a single motor is connected to an end of one of the roller shades to directly drive that shade, and an adjoining roller shade is driven by a meshing a gear attached to the other end of the first roller shade with a gear attached to the adjacent end of the next roller shade. In this manner, two or more roller shades may be driven by a single motor.

In some applications, the adjacent roller shades are arranged along a straight line. However, in other applications, each roller shade may be arranged at angle with respect to its adjacent shade. Therefore, each such arrangement could require specific pairs of gears that mesh at angles different than those required by another arrangement. To avoid the cost of making a particular set of gears for each application, it is desirable to provide a pair of gears that can mesh at a range of angles.

Moreover, at the time of installation, there may be minor differences between the angles at which the roller shades are designed to intersect and the actual angles at which they intersect. It is therefore further desirable to provide a pair of gears that are suitable for use in the presence of such differences.

Conventional spur gears have a driving shaft and a driven shaft with a plurality of teeth, respectively, for gearing with each other in parallel so that only the ratio of rotation and the direction of the rotation are changeable. However, the gearing intersection angle of the rotation of the gears is determined when the gears are designed and manufactured. Once the gearing intersection angle is determined, the angle of the rotation cannot change. That is, the gearing intersection angle is not variable.

To provide a variable gearing intersection angle, some prior systems have used a pair of semi-spherical gears. The driving shaft and the driven shaft are each provided with a semi-spherical body member having gear teeth and grooves which are longitudinally and radially arranged so that the gears may engage at any of a range of intersection angles. However, the shape of semi-spherical gears does not permit the ends of the roller shades to be placed sufficiently close to each other. Additionally, the size needed to provide sufficient torque to sequentially drive several roller shades may further increase the size of the gears needed.

Involute gears are some of the most widely used gears in industry. In an involute gear, the profiles of the teeth are involutes of a circle. The contact between two mating involute gear teeth occurs at a single instantaneous point where two involutes of the same spiral hand meet and moves along a fixed plane of contact irrespective of the center-to-center distance of the gears. Thus involute gears can handle center shifts and provide greater assembly flexibility. Moreover, the contact surface between the gears is always perpendicular to the plane of contact, thus helping reduce torque variation.

It is therefore desirable to provide involute gears that can mesh at any angle within a desired range of angles yet are capable of, for example, minimizing the separation between the ends of a pair of motorized roller shades.

SUMMARY OF THE INVENTION

It is to be understood that both the general and detailed descriptions that follow are exemplary and explanatory only and are not restrictive of the embodiments.

DISCLOSURE OF INVENTION

An aspect is an involute gear bracket system, comprising (a) first and second involute gears, each including: (i) a circular base having a surface that includes an inner region and an outer region and that is rotatable about a central axis that is perpendicular to a center of the surface; and (ii) a plurality of gear teeth extending outward from the outer region of the surface and being evenly spaced apart from each other along a plurality of locations on the outer region of the surface, the shape of each gear tooth being defined by a varying cross-sectional involute profile, wherein starting from a first involute profile that is in a plane parallel to the surface of the circular base and extending outward from a center of the circular base, each location on the first involute profile is rotated about a corresponding axis while traversing a path defined by a corresponding imaginary ray extending from the center of the circular base to that location in the first involute profile, the corresponding axis being tangential to an imaginary circle that encompasses the inner region of the surface and perpendicular to the corresponding imaginary ray; (b) a first bracket coupled to a first pivot and rotatable about the first pivot at least within a first range of angles, the first involute gear being rotatably coupled to the first bracket such that the first involute gear is rotatable about its central axis, the first pivot being located at a first distance from the central axis of the first involute gear; and (c) a second bracket coupled to a second pivot and rotatable about the second pivot at least within a second range of angles, the second involute gear being rotatably coupled to the second bracket such that the second involute gear is rotatable about its central axis, (d) wherein the first and second pivots are arranged relative to each other and relative to the central axes of the first and second involute gears, respectively, such that for any angle within the first range of angles, the gear tooth of the first involute gear meshes with the gear tooth of the second involute gear at a corresponding angle within the second range of angles.

According to a further aspect, an involute gear bracket system, comprises: (a) first and second involute gears, each including: (i) a circular base having a surface that includes an inner region and an outer region and that is rotatable about a central axis that is perpendicular to a center of the surface; and (ii) a plurality of gear teeth extending outward from the outer region of the surface and being evenly spaced apart from each other along a plurality of locations on the outer region of the surface, the shape of each gear tooth being defined by a varying cross-sectional involute profile, wherein starting from a first involute profile that is in a plane parallel to the surface of the circular base and extending outward from a center of the circular base, each location on the first involute profile is rotated about a corresponding axis while traversing a path defined by a corresponding imaginary ray extending from the center of the circular base to that location on the first involute profile, the corresponding axis being tangential to an imaginary circle that encompasses the inner region of the surface and perpendicular to the corresponding imaginary ray; (b) a back plate; (c) a first bracket coupled to the back plate at a first pivot and rotatable about the first pivot at least within a first range of angles, and including a first gear mounting portion, the first involute gear being rotatably coupled to the first gear mounting portion such that the first involute gear is rotatable about its central axis, the first pivot being located at a first distance from the central axis of the first involute gear; and (d) a second bracket coupled to the back plate at a second pivot and rotatable about the second pivot at least within a second range of angles, and including a second gear mounting portion, the second involute gear being rotatably coupled to the second gear mounting portion such that the second involute gear is rotatable about its central axis, (e) wherein the first pivot is located tangential to the imaginary circle of the first involute gear and at a first distance from the central axis of the first involute gear, the second pivot is located tangential to the imaginary circle of the second involute gear and at a second distance from the central axis of the second involute gear and is parallel to the first pivot, and the first bracket and the second bracket are interconnected such that a first angle formed between the inner region of the surface of the first gear and a mid-plane perpendicular to and bisecting an imaginary line extending from the first pivot to the second pivot, and a second angle formed between the inner region of the surface of the second gear and the mid-plane, each have a same value, so that for any angle within the first range of angles, the gear tooth of the first involute gear meshes with the gear tooth of the second involute gear at a corresponding angle within the second range of angles.

According to another aspect, a window shade system, comprises: (a) a first bracket having a window frame mounting portion attachable to a first window frame, and a receiving portion for receiving an end of a first window shade roller of a first window shade; (b) a second bracket having a window frame mounting portion attachable to a second window frame, and a receiving portion for receiving an end of a second window shade roller of a second window shade; (c) first and second involute gears, each including: (i) a circular base having a surface that includes an inner region and an outer region and that is rotatable about a central axis that is perpendicular to a center of the surface; and (ii) a plurality of gear teeth extending outward from the outer region of the surface and being evenly spaced apart from each other along a plurality of locations on the outer region of the surface, the shape of each gear tooth being defined by a varying cross-sectional involute profile, wherein starting from a first involute profile that is in a plane parallel to the surface of the circular base and extending outward from a center of the circular base, each location on the first involute profile is rotated about a corresponding axis while traversing a path defined by a corresponding imaginary ray extending from the center of the circular base to that location in the first involute profile, the corresponding axis being tangential to an imaginary circle that encompasses the inner region of the surface and perpendicular to the corresponding imaginary ray; (d) the first bracket being coupled to a first pivot and rotatable about the first pivot at least within a first range of angles, the first involute gear being rotatably coupled to the receiving portion of the first bracket such that the first involute gear and the first window shade roller are rotatable about the central axis of the first involute gear, the first pivot being located at a first distance from the central axis of the first involute gear; and (e) the second bracket being coupled to a second pivot and rotatable about the second pivot at least within a second range of angles, the second involute gear being rotatably coupled to the receiving portion of the second bracket such that the second involute gear and the second window shade roller are rotatable about the central axis of the second involute gear, the second pivot being located at a second distance from the central axis of the second involute gear; and (f) the first and second pivots are arranged relative to each other and relative to the central axes of the first and second involute gears, respectively, such that for any angle within the first range of angles, the gear tooth of the first involute gear meshes with the gear tooth of the second involute gear at a corresponding angle within the second range of angles.

According to yet another aspect, a window shade system, comprises: (a) a back plate; (b) a first bracket coupled to the back plate at a first pivot and having a window frame mounting portion attachable to a first window frame, and a receiving portion for receiving an end of a first window shade roller of a first window shade; (c) a second bracket coupled to the back plate at a first pivot and having a window frame mounting portion attachable to a second window frame, and a receiving portion for receiving an end of a second window shade roller of a second window shade; (d) first and second involute gears, each including: (i) a circular base having a surface that includes an inner region and an outer region and that is rotatable about a central axis that is perpendicular to a center of the surface; and (ii) a plurality of gear teeth extending outward from the outer region of the surface and being evenly spaced apart from each other along a plurality of locations on the outer region of the surface, the shape of each gear tooth being defined by a varying cross-sectional involute profile, wherein starting from a first involute profile that is in a plane parallel to the surface of the circular base and extending outward from a center of the circular base, each location on the first involute profile is rotated about a corresponding axis while traversing a path defined by a corresponding imaginary ray extending from the center of the circular base to that location in the first involute profile, the corresponding axis being tangential to an imaginary circle that encompasses the inner region of the surface and perpendicular to the corresponding imaginary ray; (e) the first bracket being rotatable about the first pivot at least within a first range of angles, the first involute gear being rotatably coupled to the receiving portion of the first bracket such that the first involute gear and the first window shade roller are rotatable about the central axis of the first involute gear, the first pivot being located at a first distance from the central axis of the first involute gear; and (f) the second bracket being rotatable about the second pivot at least within a second range of angles, the second involute gear being rotatably coupled to the receiving portion of the second bracket such that the second involute gear and the second window shade roller are rotatable about the central axis of the second involute gear, the second pivot being located at a second distance from the central axis of the second involute gear; and (g) wherein the first pivot is tangential to the imaginary circle of the first involute gear and is located at a first distance from the central axis of the first involute gear, the second pivot is tangential to the imaginary circle of the second involute gear and is located at a second distance from the central axis of the second involute gear and is parallel to the first pivot, and the first bracket and the second bracket are interconnected such that a first angle formed between the inner region of the surface of the first gear and a mid-plane perpendicular to and bisecting an imaginary line extending from the first pivot to the second pivot, and a second angle formed between the inner region of the surface of the second gear and the mid-plane, each have a same value, so that for any angle within the first range of angles, the gear tooth of the first involute gear meshes with the gear tooth of the second involute gear at a corresponding angle within the second range of angles.

BRIEF DESCRIPTION OF DRAWINGS

The accompanying figures further illustrate the present embodiments.

The components in the drawings are not necessarily drawn to scale, emphasis instead being placed upon clearly illustrating the principles of the present embodiments. In the drawings, like reference numerals designate corresponding parts throughout the several views.

BRIEF DESCRIPTION OF THE SEVERAL VIEWS OF THE DRAWING

Figure 1:
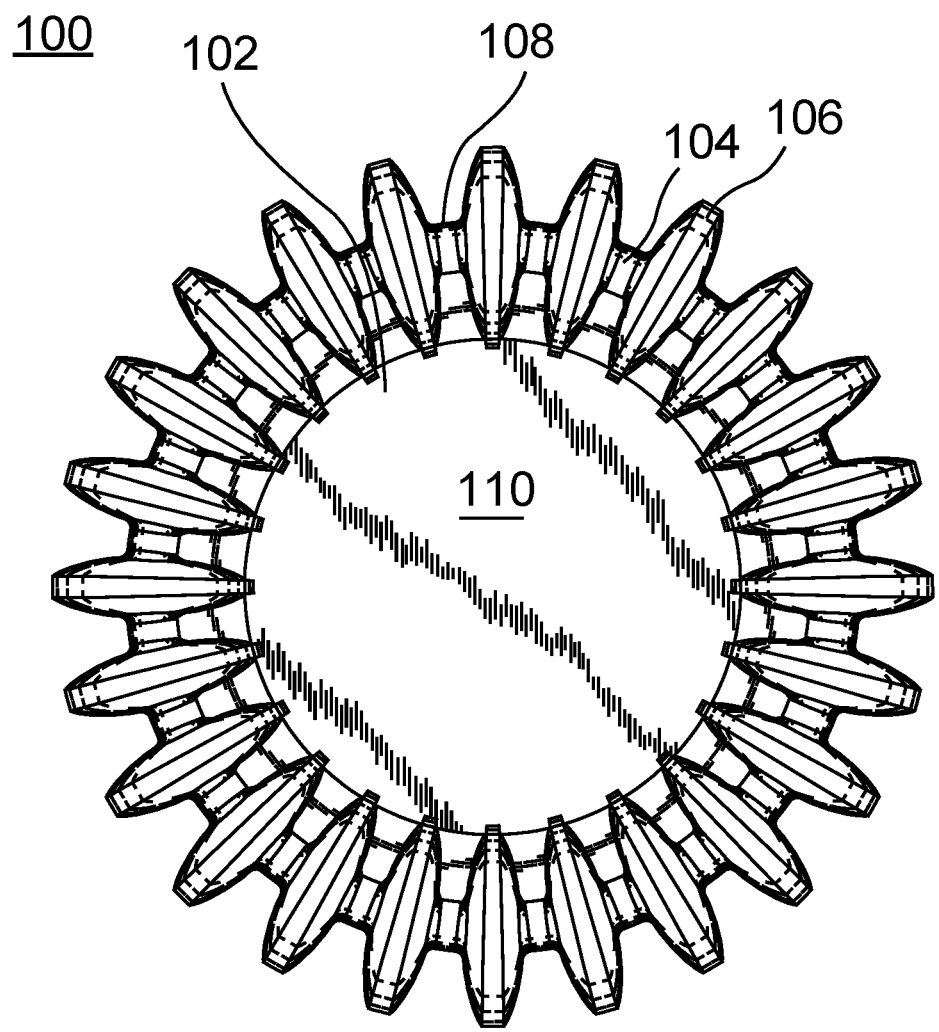

FIG. 1 shows a top view of an involute gear in accordance with an embodiment.

FIGS. 2A-2E are schematic diagrams showing an example of a shape of a gear tooth of the involute gear in accordance with an embodiment.

Figure 3A:
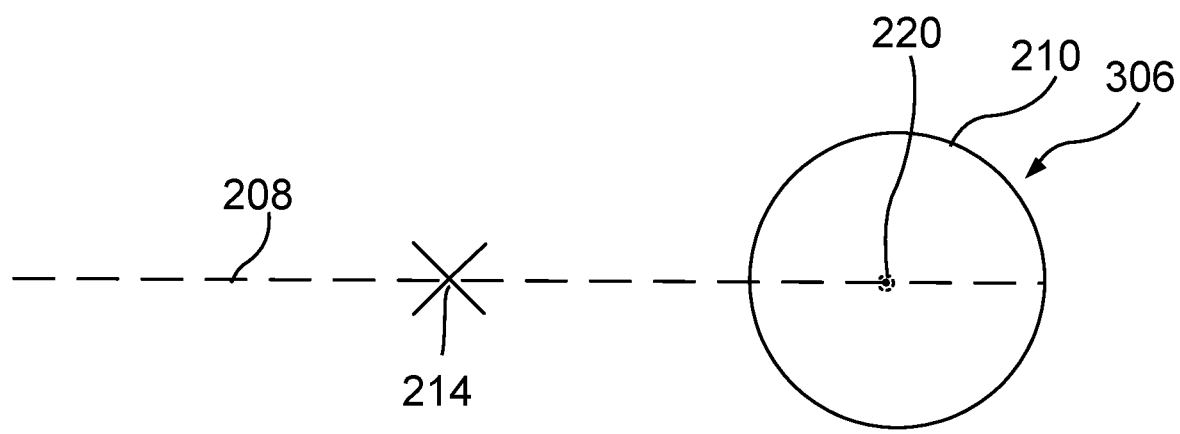
Figure 3B:
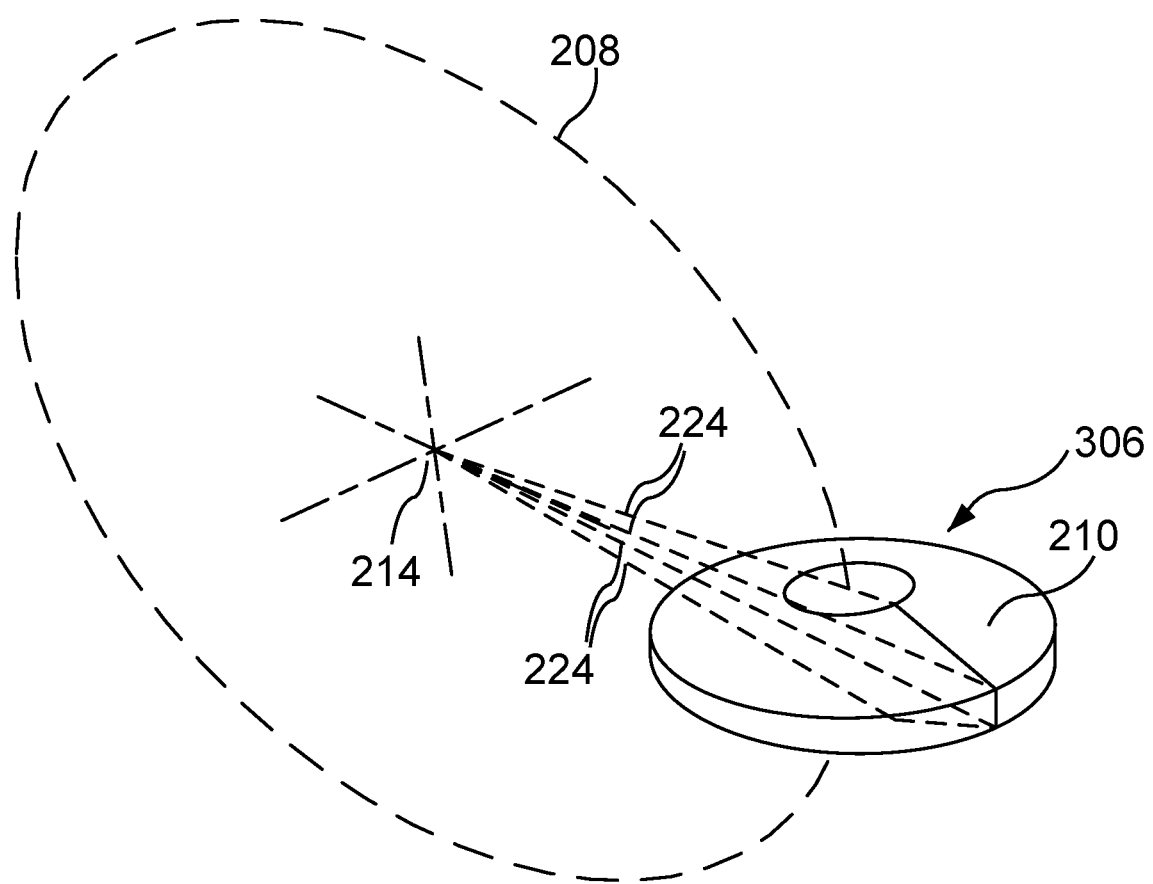

FIGS. 3A-3B are schematic diagrams showing an example of another shape of a gear tooth of the involute gear in accordance with another embodiment.

Figure 4:
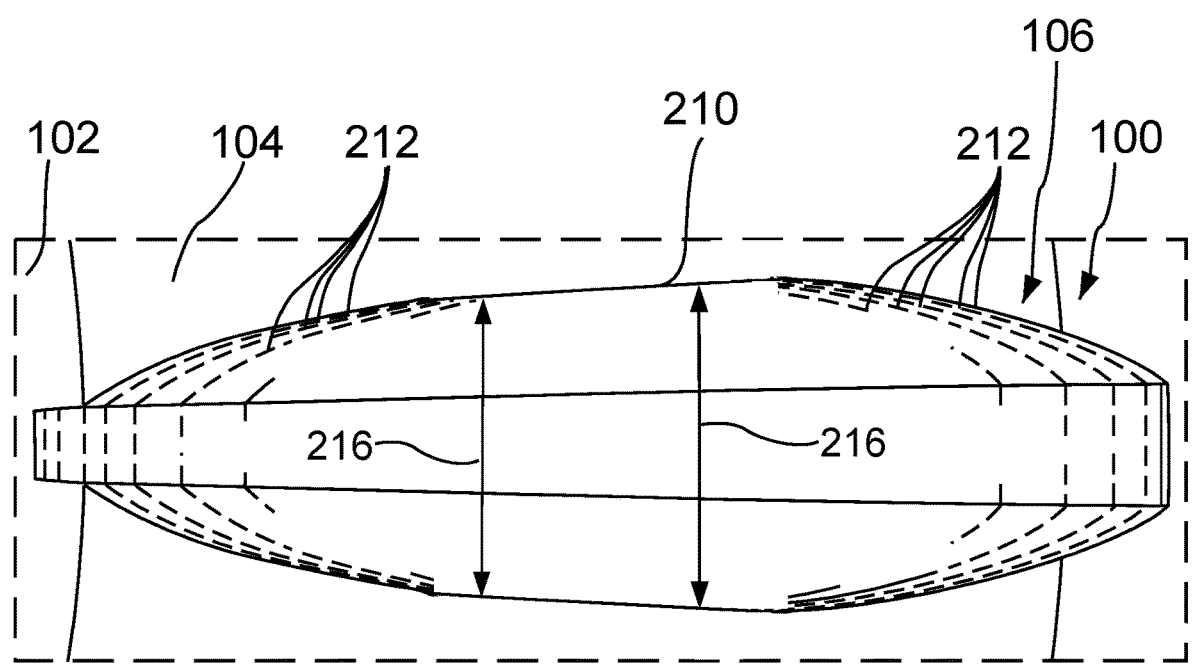

FIG. 4 shows an enlarged top view of the gear tooth in accordance with an embodiment.

Figure 5A:
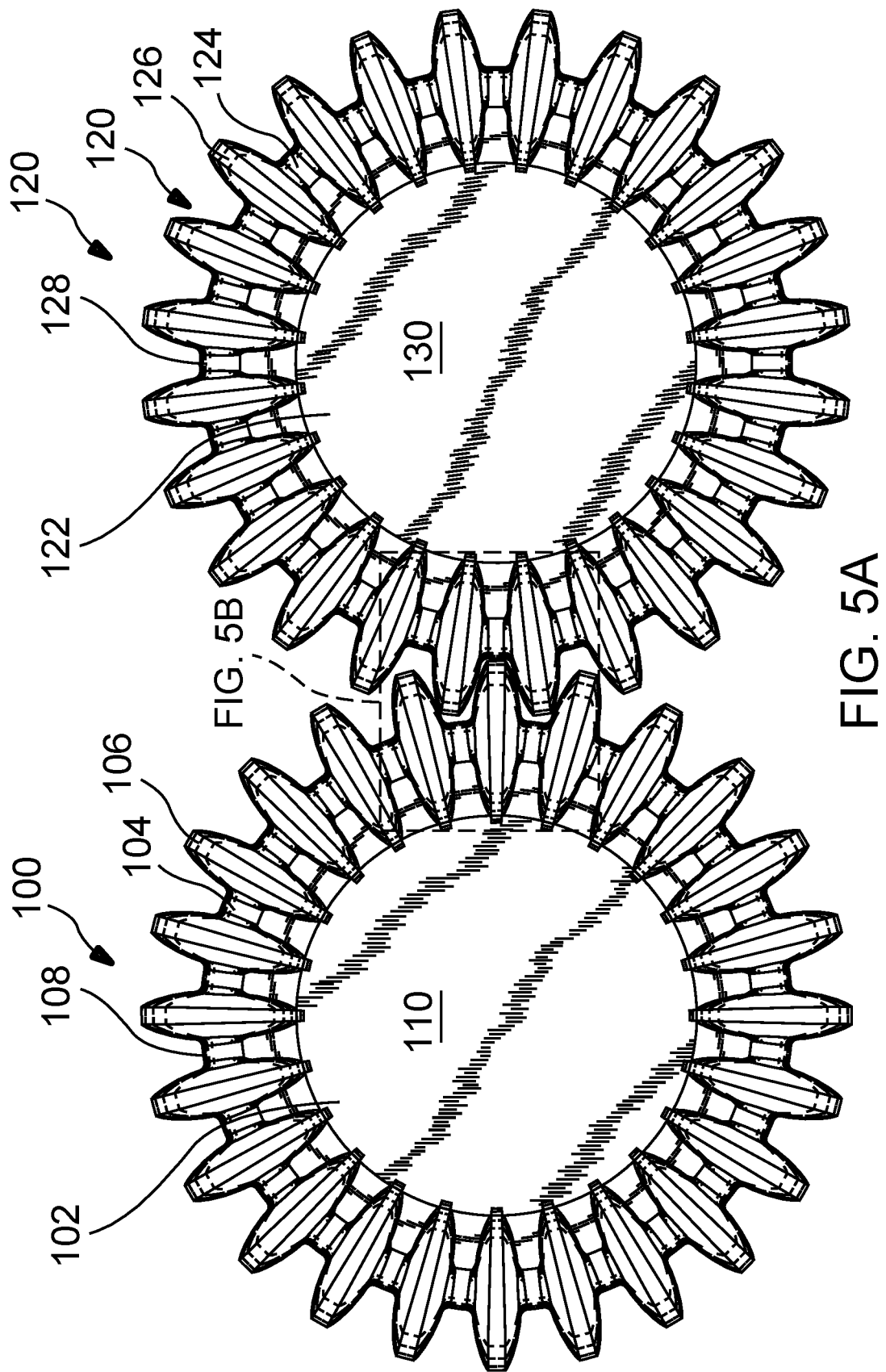
Figure 5B:
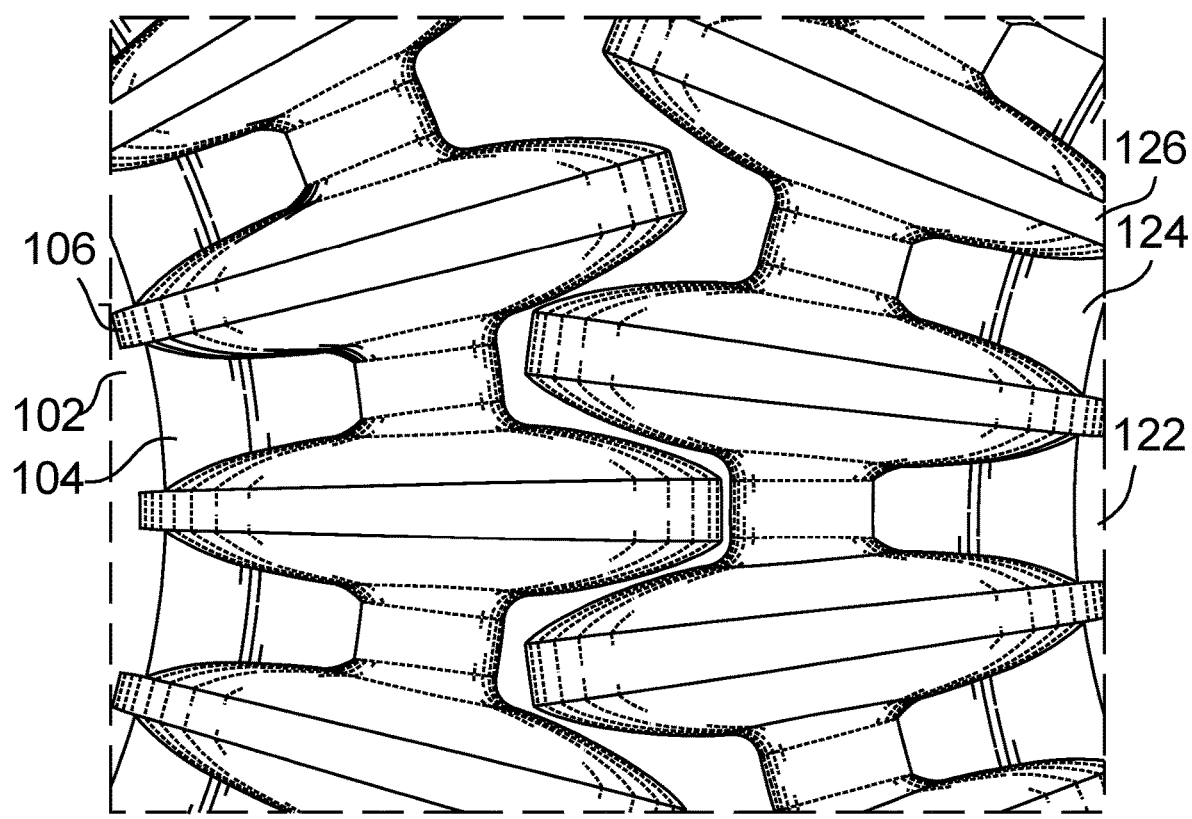

FIG. 5A shows a front view of an arrangement of a pair of involute gears in accordance with an embodiment; and FIG. 5B depicts an enlarged portion of the top view of the pair of the involute gears shown in FIG. 5A.

Figure 6A:
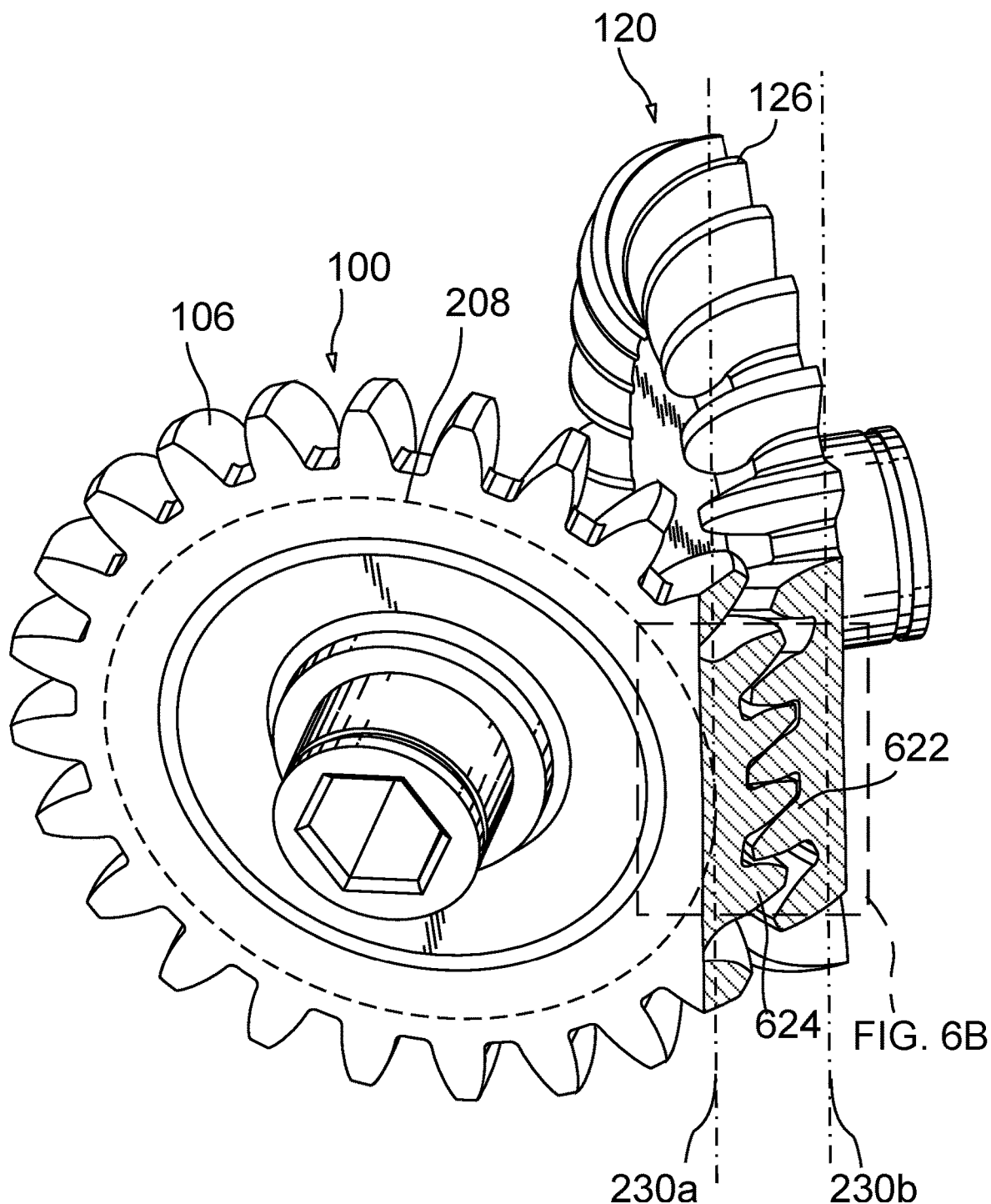
Figure 6B:
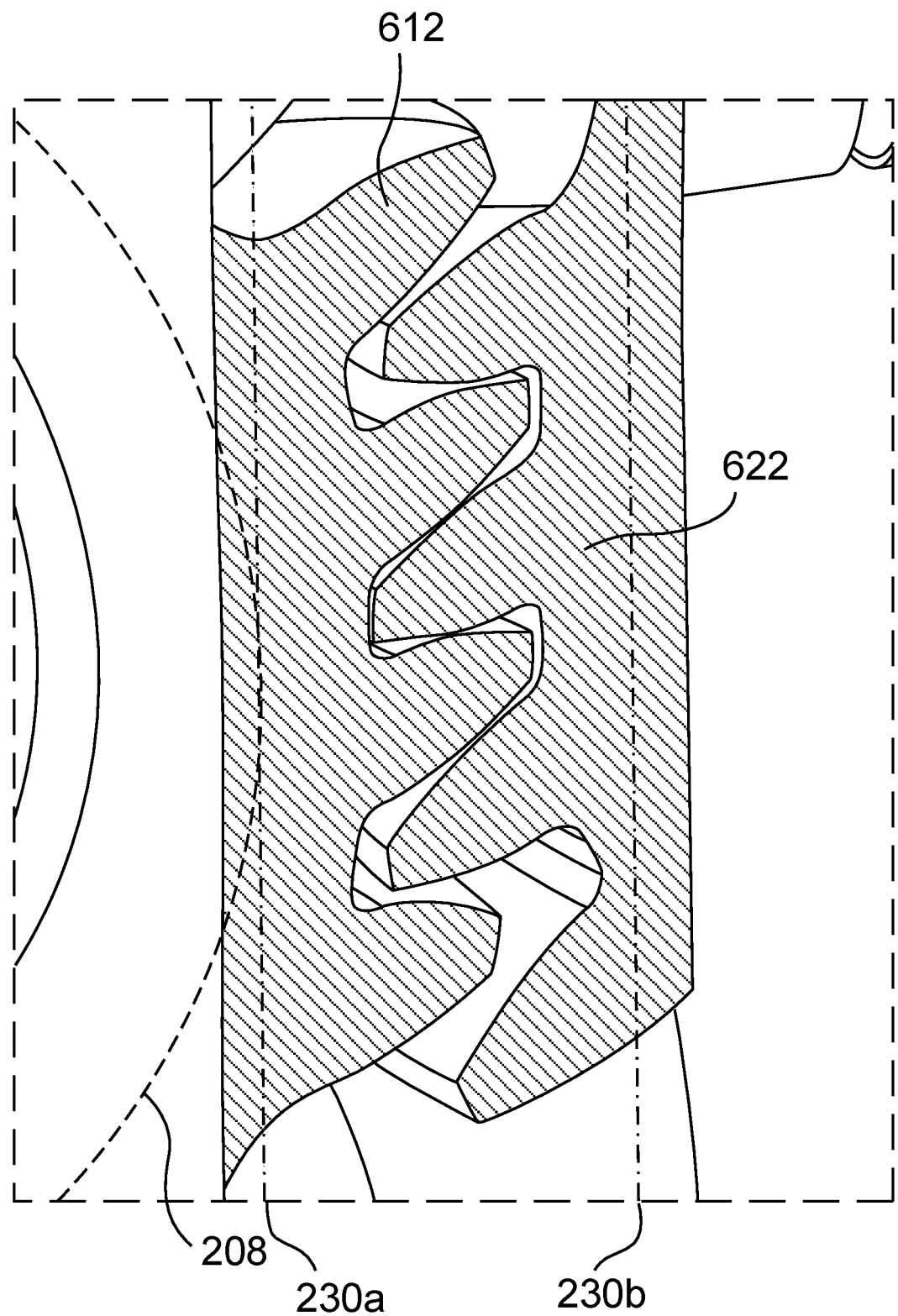

FIG. 6A depicts a side perspective view of another arrangement of the pair of involute gears shown in FIG. 5A and includes a cross-sectional view of a mating portion of the involute gears; and FIG. 6B shows a close-up view of the cross-sectional portion shown in FIG. 6A.

Figure 7:
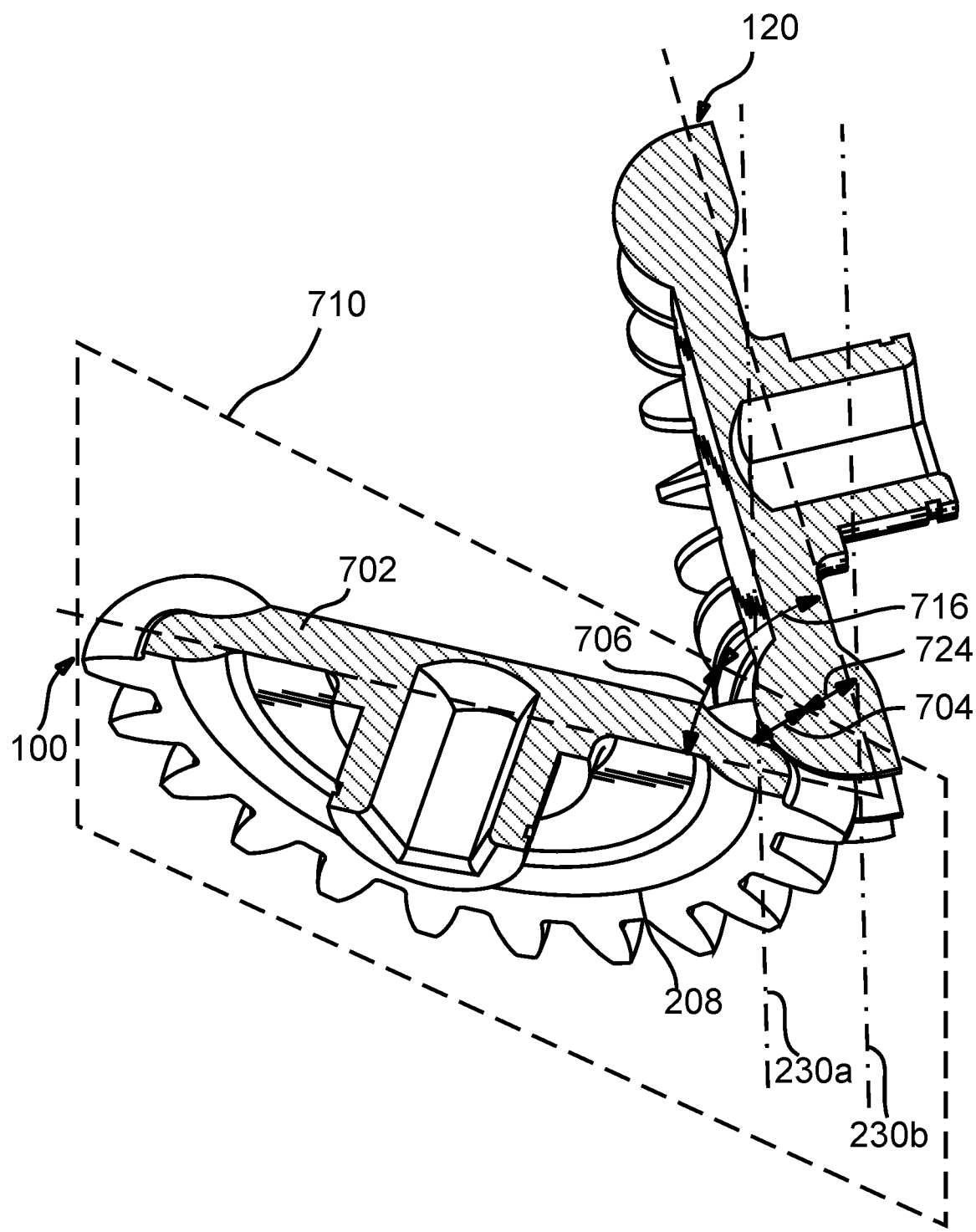

FIG. 7 depicts a perspective view of a further arrangement of the involute gears shown in FIG. 5A and includes a cross-sectional view of the involute gears.

Figure 8:
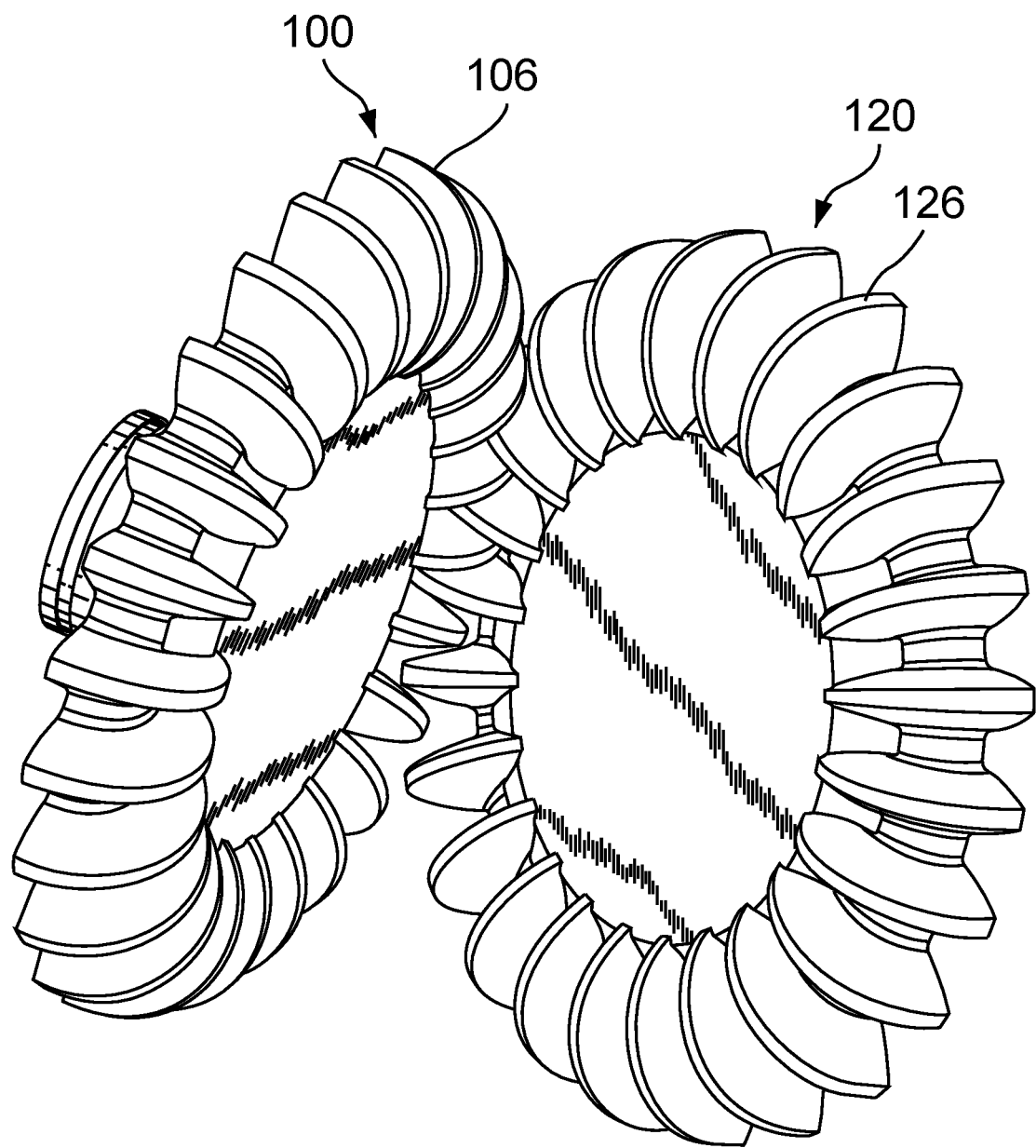

FIG. 8 shows a front perspective view of a still further arrangement of the involute gears shown in FIG. 5A.

Figure 9:
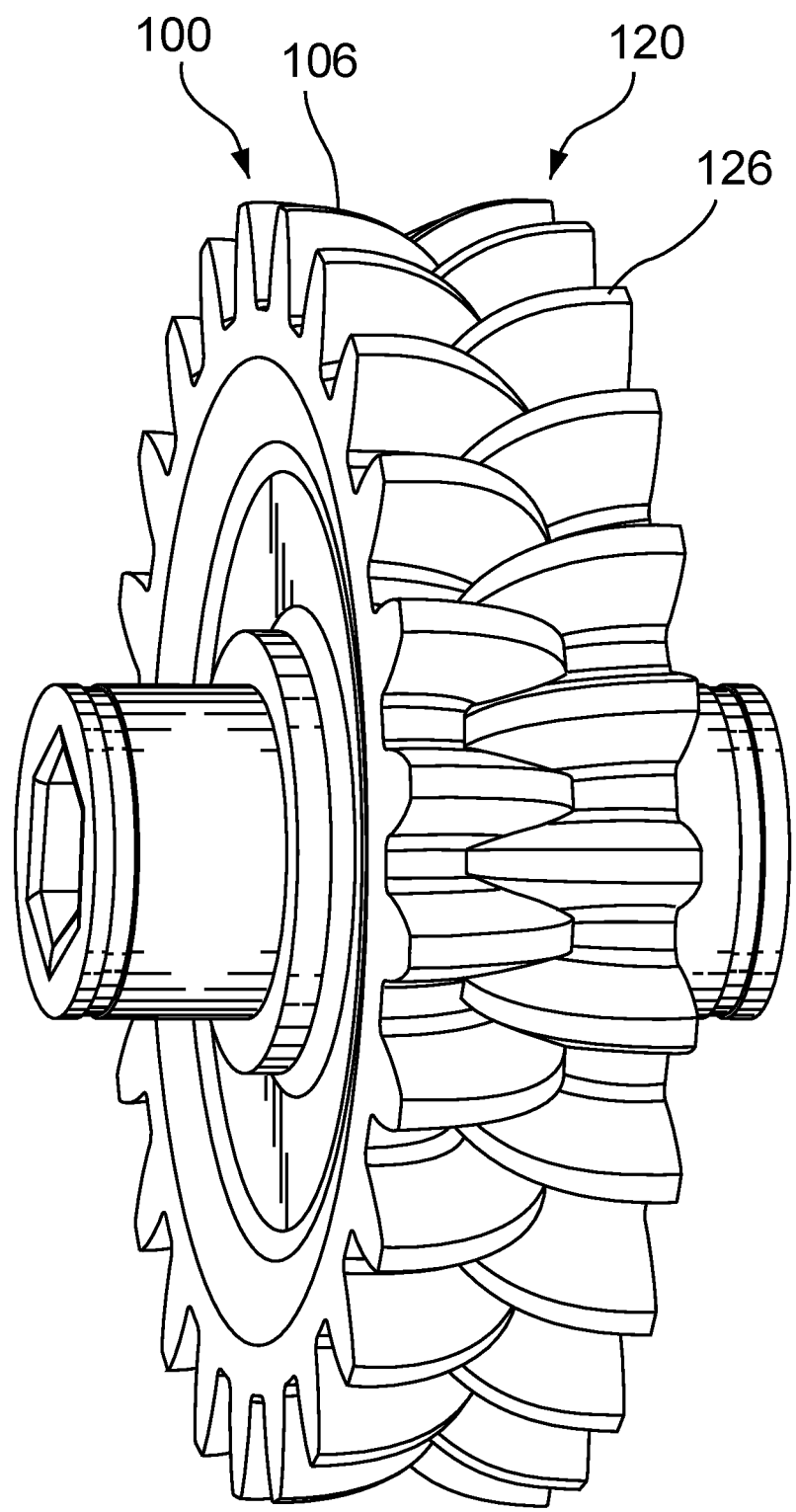

FIG. 9 shows a side perspective view of yet another arrangement of the involute gears shown in FIG. 5A.

Figure 10:
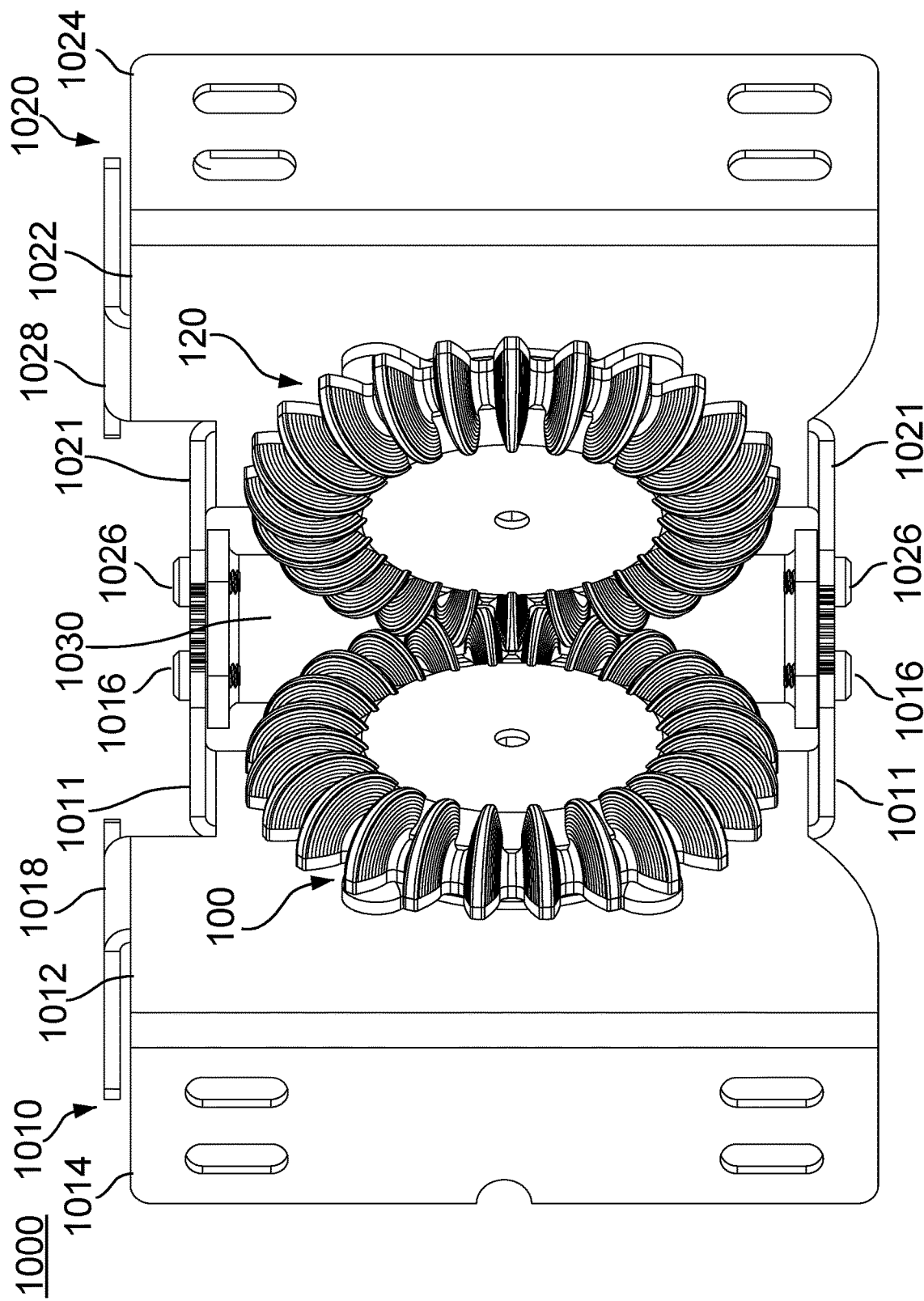

FIG. 10 depicts a front perspective view of a configuration of a mounting bracket system in accordance with an embodiment.

Figure 11:
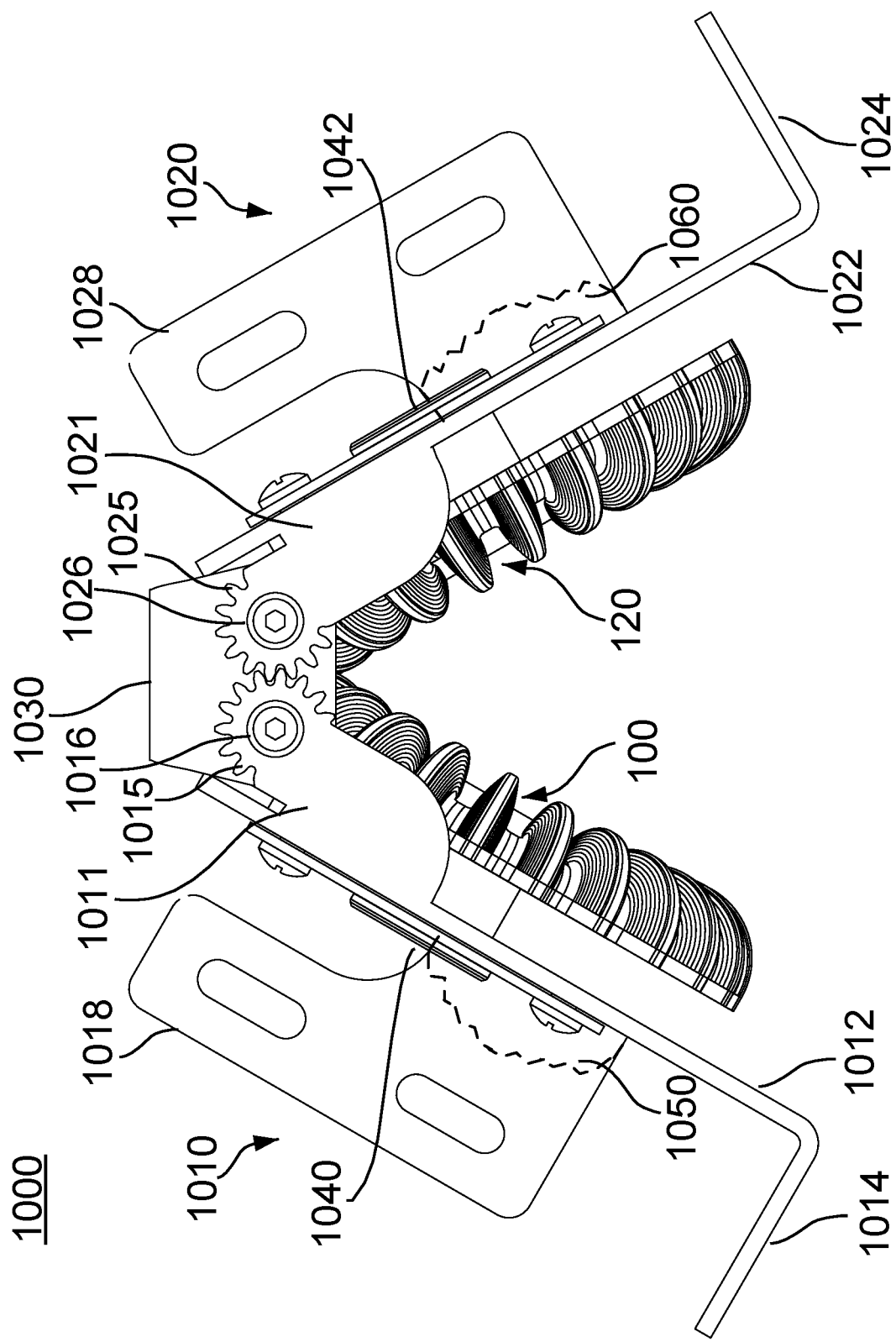

FIG. 11 shows a top perspective view of the configuration of the mounting bracket system shown in FIG. 10.

Figure 12:
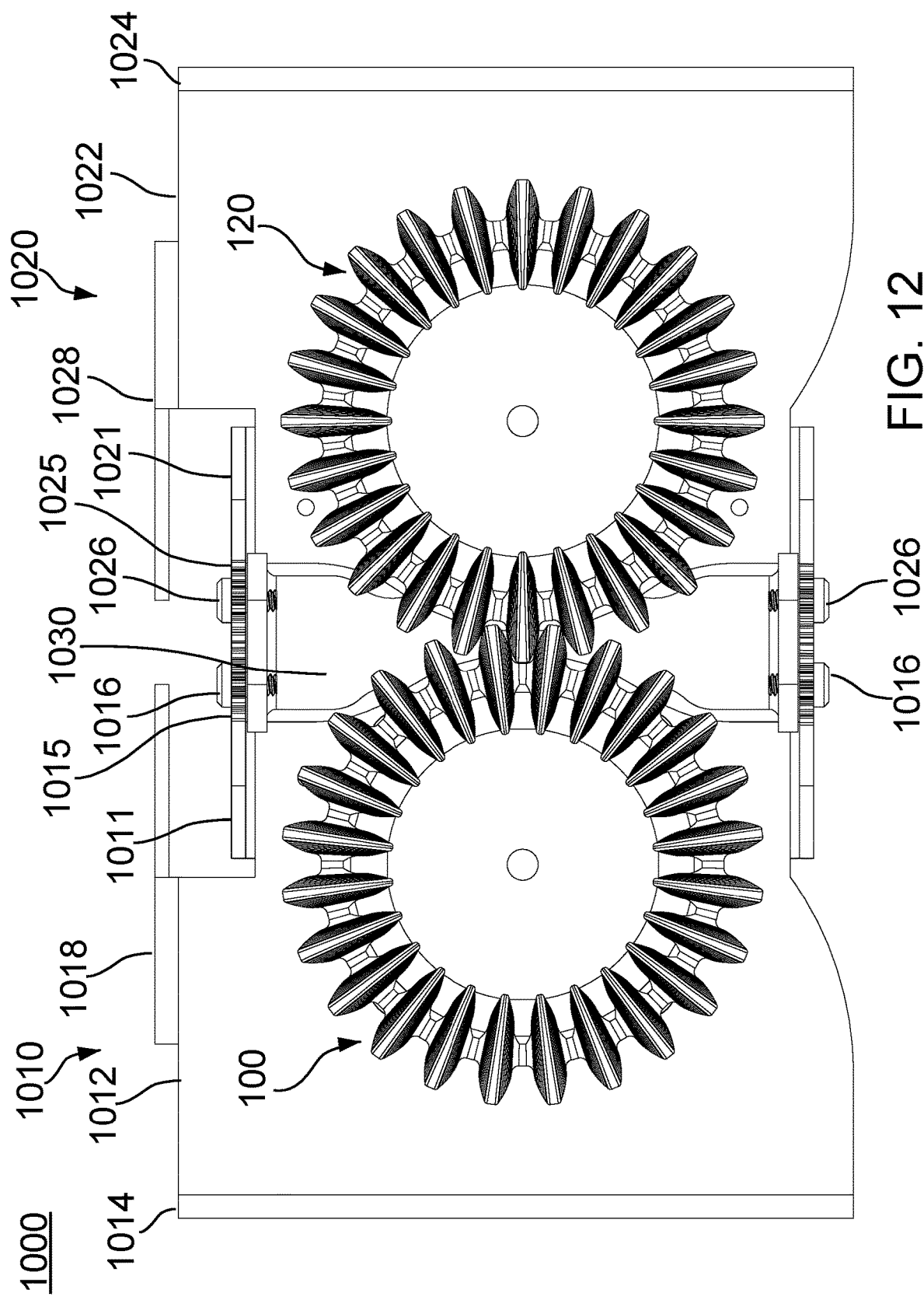

FIG. 12 depicts a front perspective view of another configuration of the mounting bracket system shown in FIG. 10.

Figure 13:
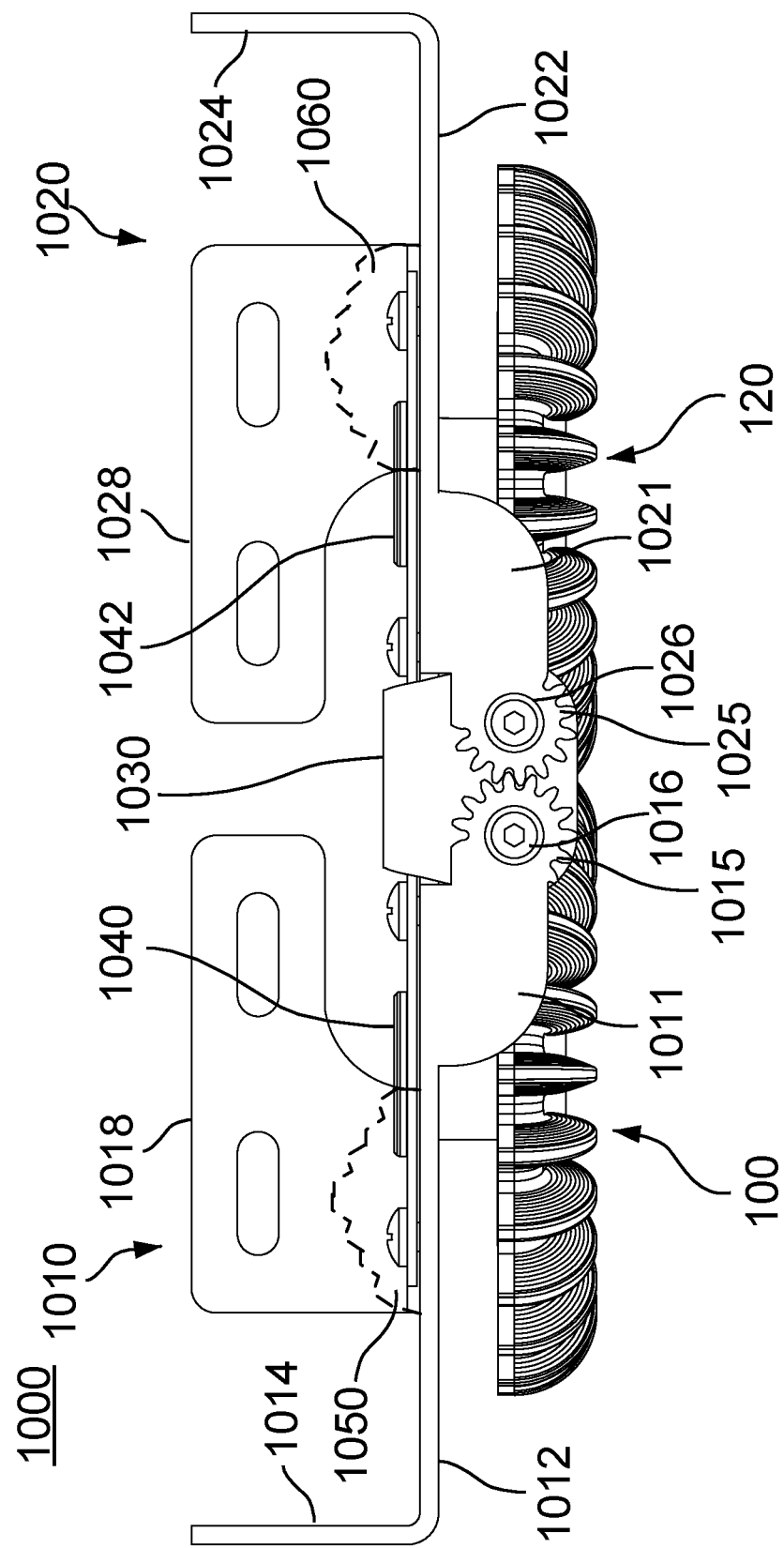

FIG. 13 shows a top perspective view of the configuration of the mounting bracket system shown in FIG. 12.

Figure 14:
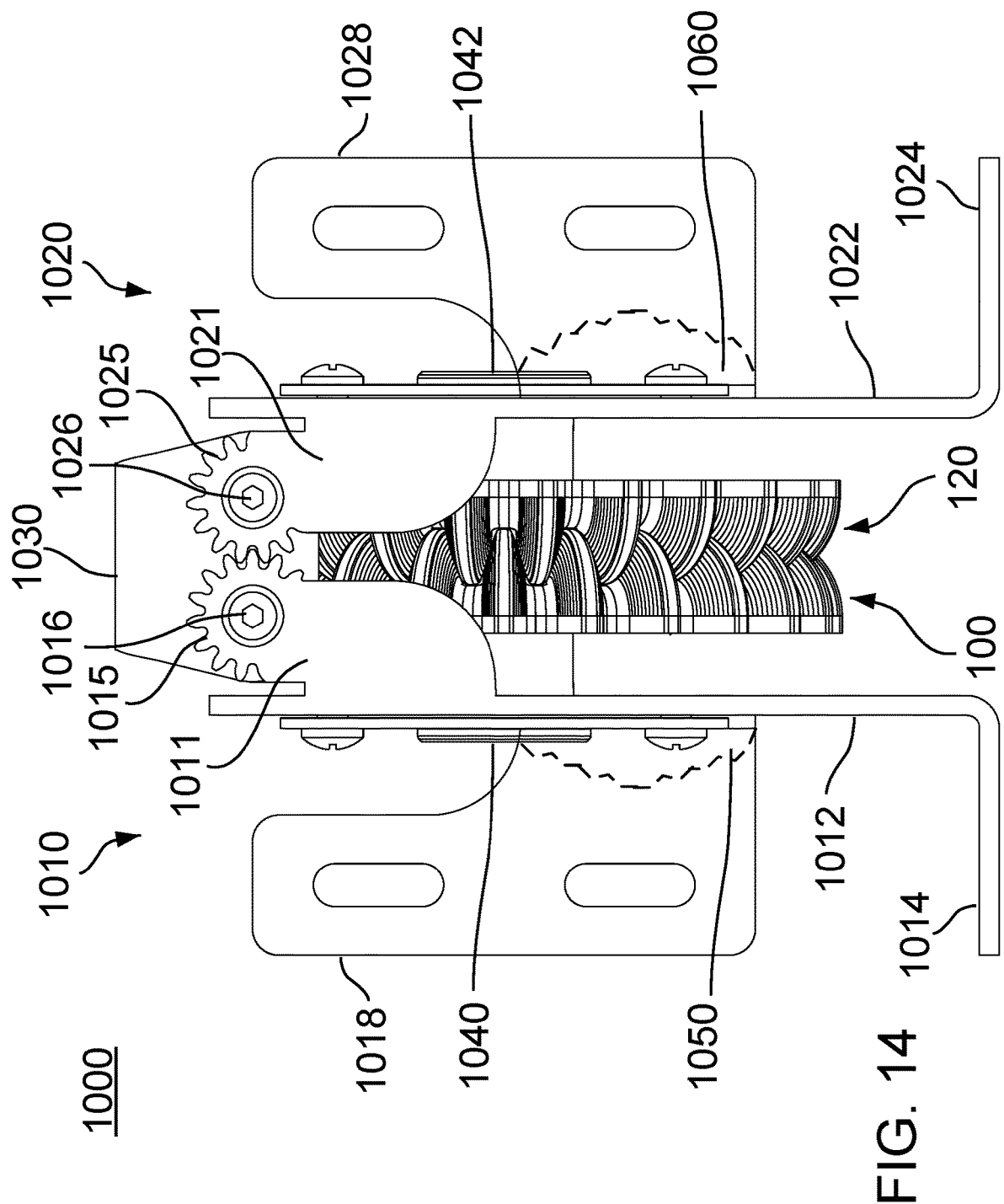

FIG. 14 shows a top perspective view of yet another configuration of the mounting bracket system shown in FIG. 10.

Figure 15:
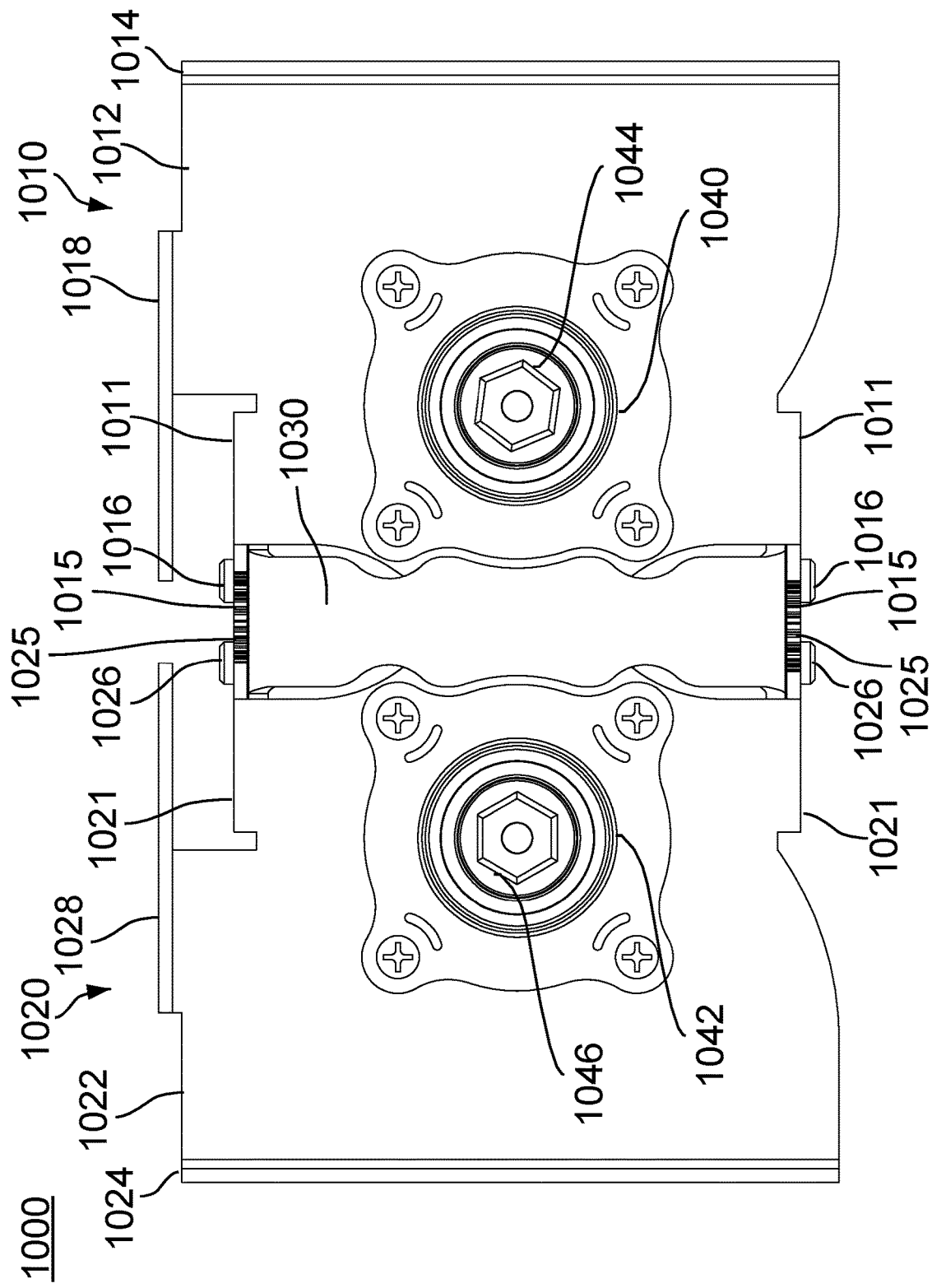

FIG. 15 depicts a back perspective view of the configuration of the mounting bracket system shown in FIG. 10.

Figure 16:
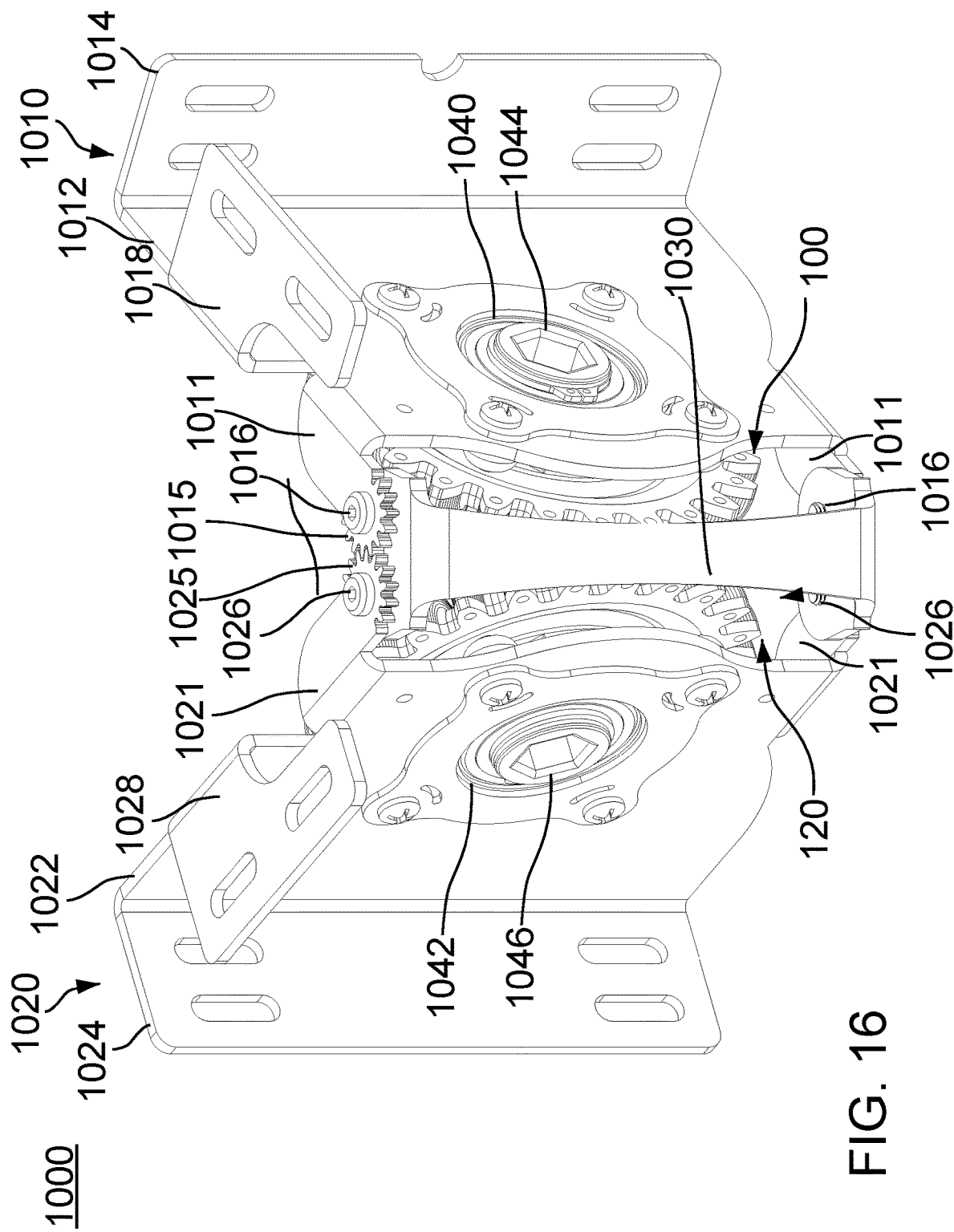

FIG. 16 depicts a back perspective view of a further configuration of the bracket system shown in FIG. 10.

Figure 17A:
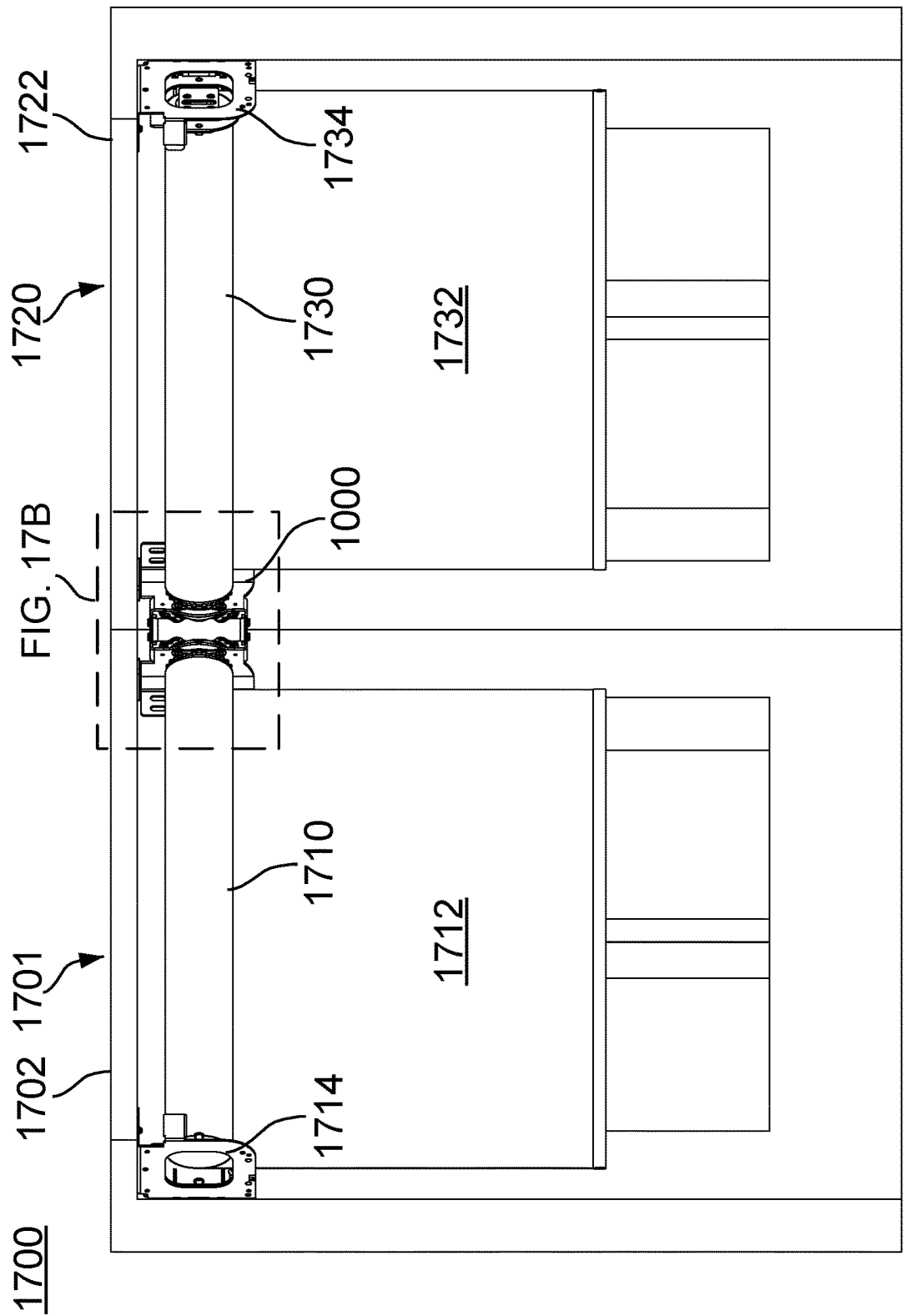
Figure 17B:
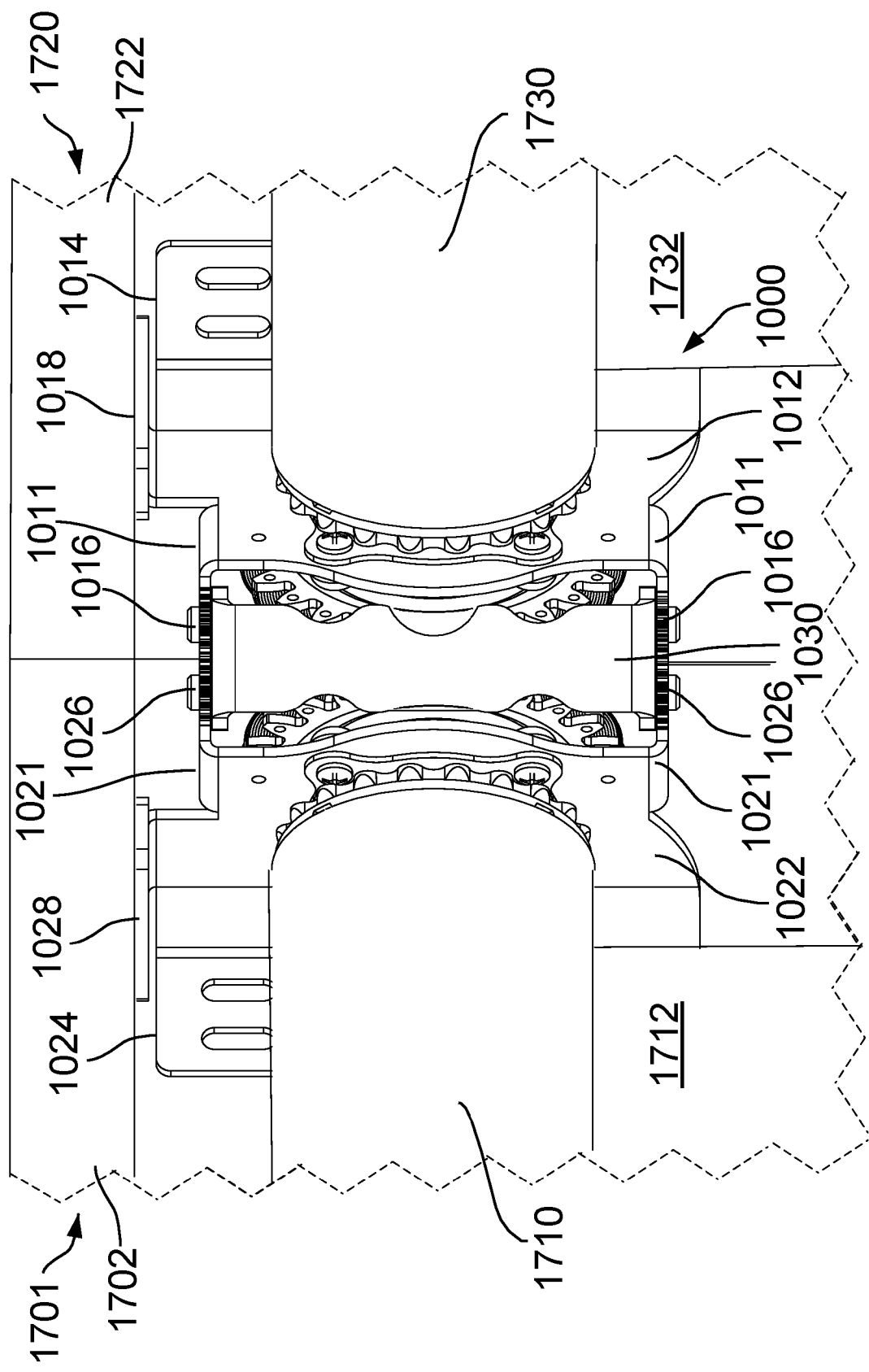

FIG. 17A shows a front perspective view of a window shade system in accordance with an embodiment, and FIG. 17B shows in greater detail the mounting bracket system part of the window shade system depicted in FIG. 17A.

Figure 18B:
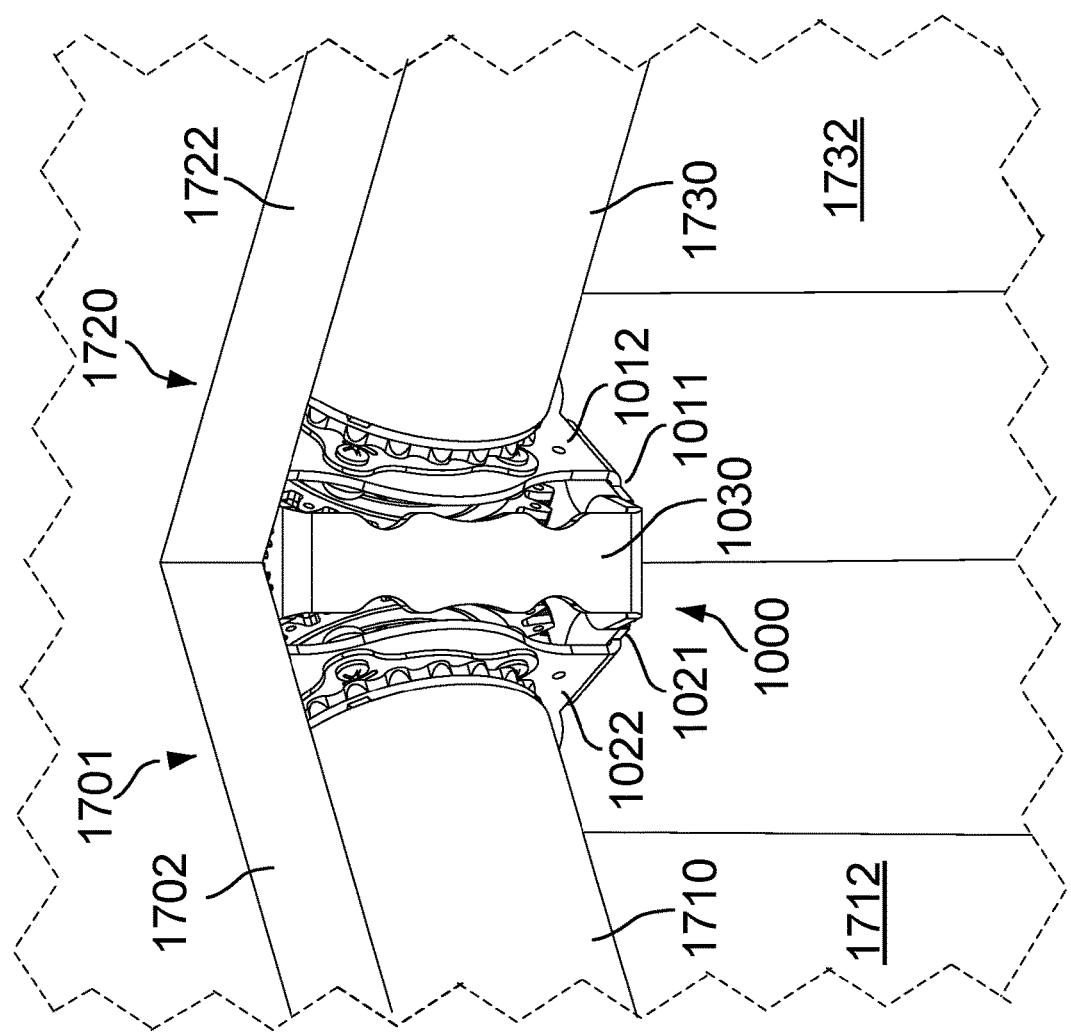

FIG. 18A shows a frontal perspective view from above of the window shade system depicted in FIG. 17A, and FIG. 18B shows in greater detail the mounting bracket system part of the window shade system depicted in FIG. 18A.

Figure 19A:
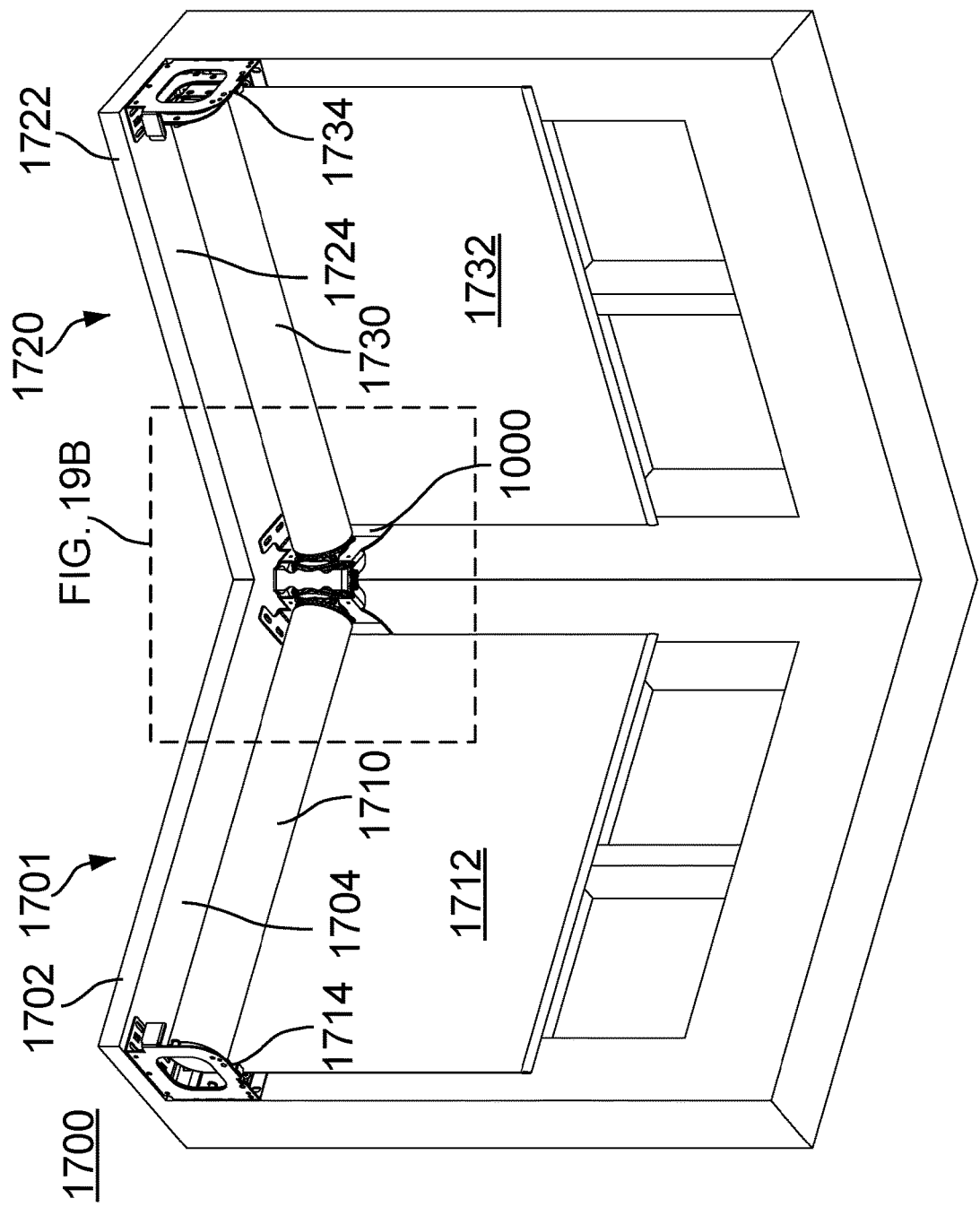
Figure 19B:
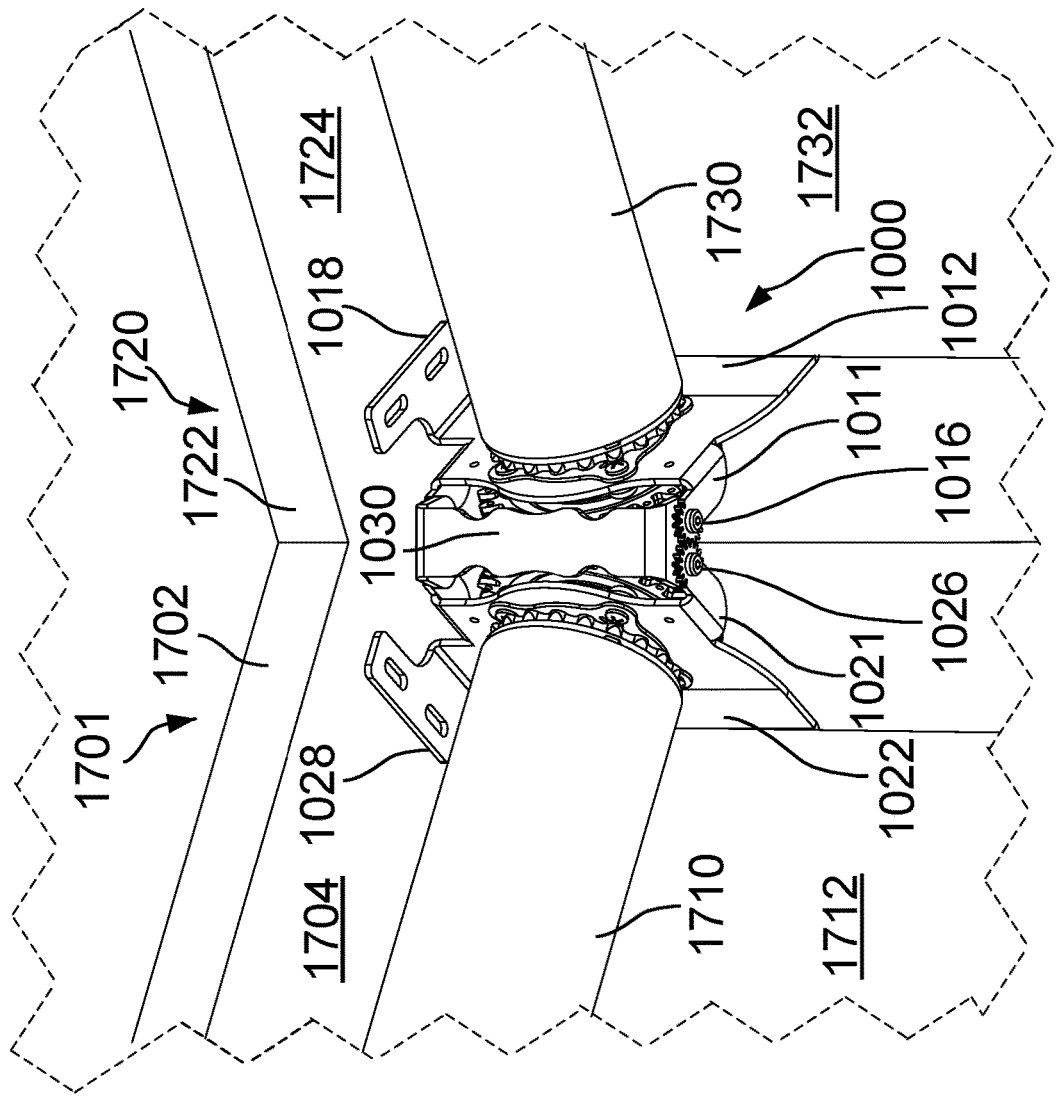

FIG. 19A shows a frontal perspective view from below of the window shade system depicted in FIG. 17A, and FIG. 19B shows in greater detail the mounting bracket system part of the window shade system depicted in FIG. 19A.

Figure 20:
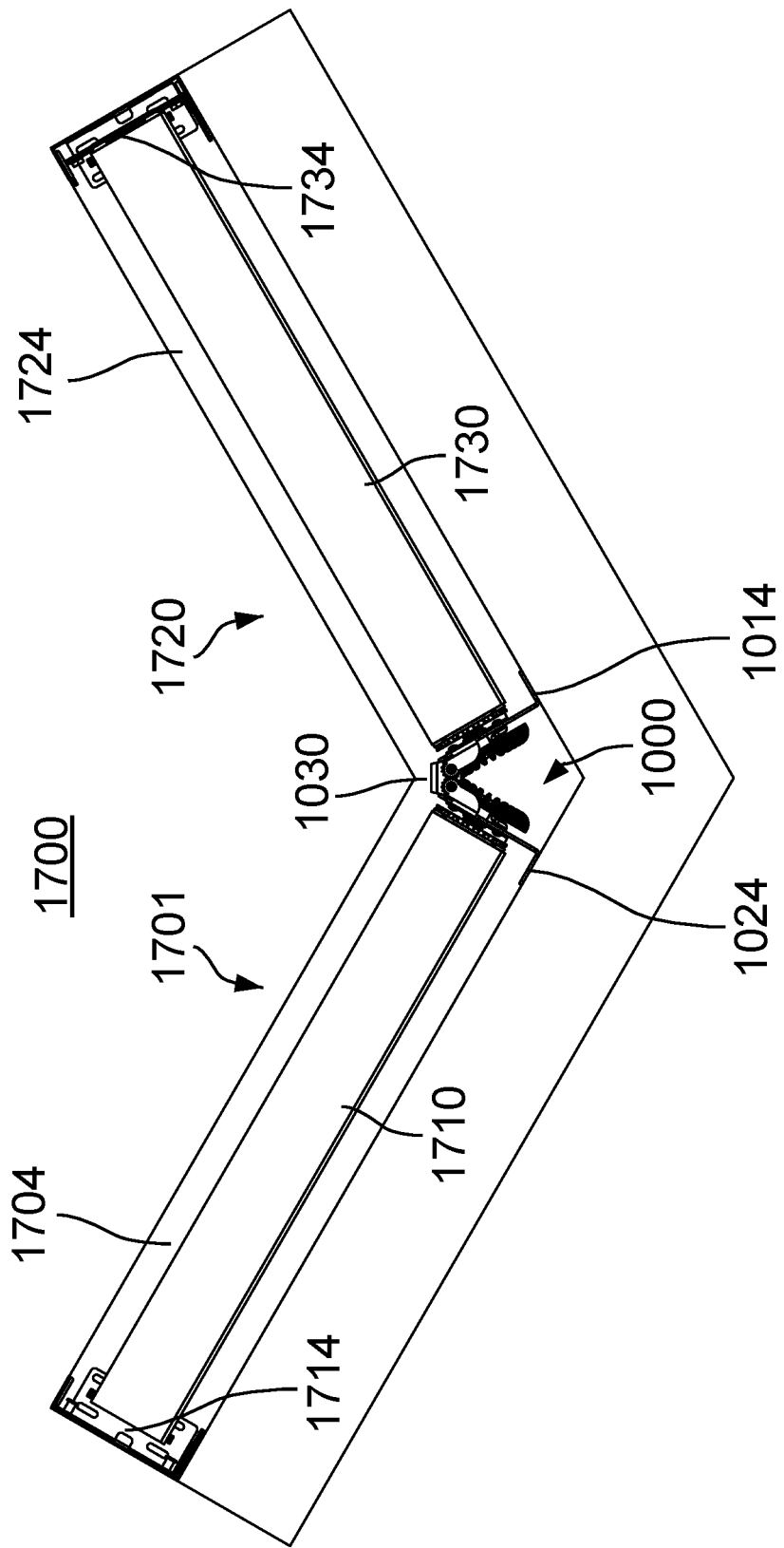

FIG. 20 shows a bottom perspective view of the window shade system depicted in FIG. 17A

DETAILED DESCRIPTION OF THE INVENTION

The present embodiments provide involute gears in which a pair of gears is capable of meshing at any of a range of gearing intersection angles. The shape of the gear teeth is defined by an involute outer profile that collapses inward with decreasing distance from the center of the gear.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

LIST OF REFERENCE NUMBERS FOR THE MAJOR ELEMENTS IN THE DRAWING

The following is a list of the major elements in the drawings in numerical order.

100 first involute gear
102 inner region (of first involute gear 100)
104 outer region (of first involute gear 100)
106 gear tooth (of first involute gear 100)
108 circular base (of first involute gear 100)
110 first surface (of first involute gear 100)
120 second involute gear 120
122 inner region (of second involute gear 120)
124 outer region (of second involute gear 120)
126 gear tooth (of second involute gear 120)
128 circular base (of second involute gear 120)
130 first surface (of second involute gear 120)
208 imaginary circle
210 outer surface (of gear tooth)
212 involute outer profile (of gear tooth)
214 center of involute gear
216 width (of involute outer profile 212)
218 length (of involute outer profile 212)
220 axes of rotation (of locations on involute profile)
222 end portion (of involute outer profile 212)
224 imaginary rays (from center of involute gear to location on involute profile)
230a, 230b pivots
306 gear tooth
622 cross-section (of gear tooth 106)
624 cross-section (of gear tooth 126)
706 first angle
710 mid-plane
716 second angle 1000 mounting bracket
1010 first plate
1011 pivoting portion (of first plate 1010)
1012 back wall (of first plate 1010)
1014 side wall (of first plate 1010)
1015 interlocking end gears (of pivoting portion 1011)
1016 first pivot element
1018 top wall (of first plate 1010)
1020 second plate
1021 pivoting portion (of second plate 1020)
1022 back wall (of second plate 1020)
1024 wall mounting portion (of second plate 1020)
1025 interlocking end gears (of pivoting portion 1021)
1026 second pivot element
1028 top wall (of second plate 1020)
1030 back plate
1040 rotation mount (of first plate 1010)
1042 rotation mount (of second plate 1020)
1044 back side opening (of first gear 100)
1046 back side opening (of second gear 120)
1050 cut-away region (of top wall 1018)
1060 cut-away region (of top wall 1028)
1700 window shade system
1701 first window frame
1702 window frame head (of first window frame 1701)
1704 inner surface (of window frame head 1710)
1710 window shade roller (of first window frame 1701)
1712 window shade (of first window frame 1700)
1714 end bracket (of first window frame 1701)
1720 second window frame
1722 window frame head (of second window frame 1720)
1724 inner surface (of window frame head 1722)
1730 window shade roller (of second window frame 1720)
1732 window shade (of second window frame 1720)
1734 end bracket (of second window frame 1720)

MODE(S) FOR CARRYING OUT THE INVENTION

The embodiment described herein in the context of an involute gear system, but is not limited thereto, except as may be set forth expressly in the appended claims.

Referring first to FIG. 1, a first involute gear 100 is depicted in accordance with an embodiment. The first involute gear 100 includes a circular base 108 having a first surface 110 which is divided into a central, inner region 102 and an outer region 104 which encloses the inner region 102. A plurality of gear teeth 106 are arranged at respective locations on the first involute gear 100. Each one of the gear teeth extends upwardly, in part, and outwardly, in part, primarily from the outer region 104 of the first surface.

Figure 2A:
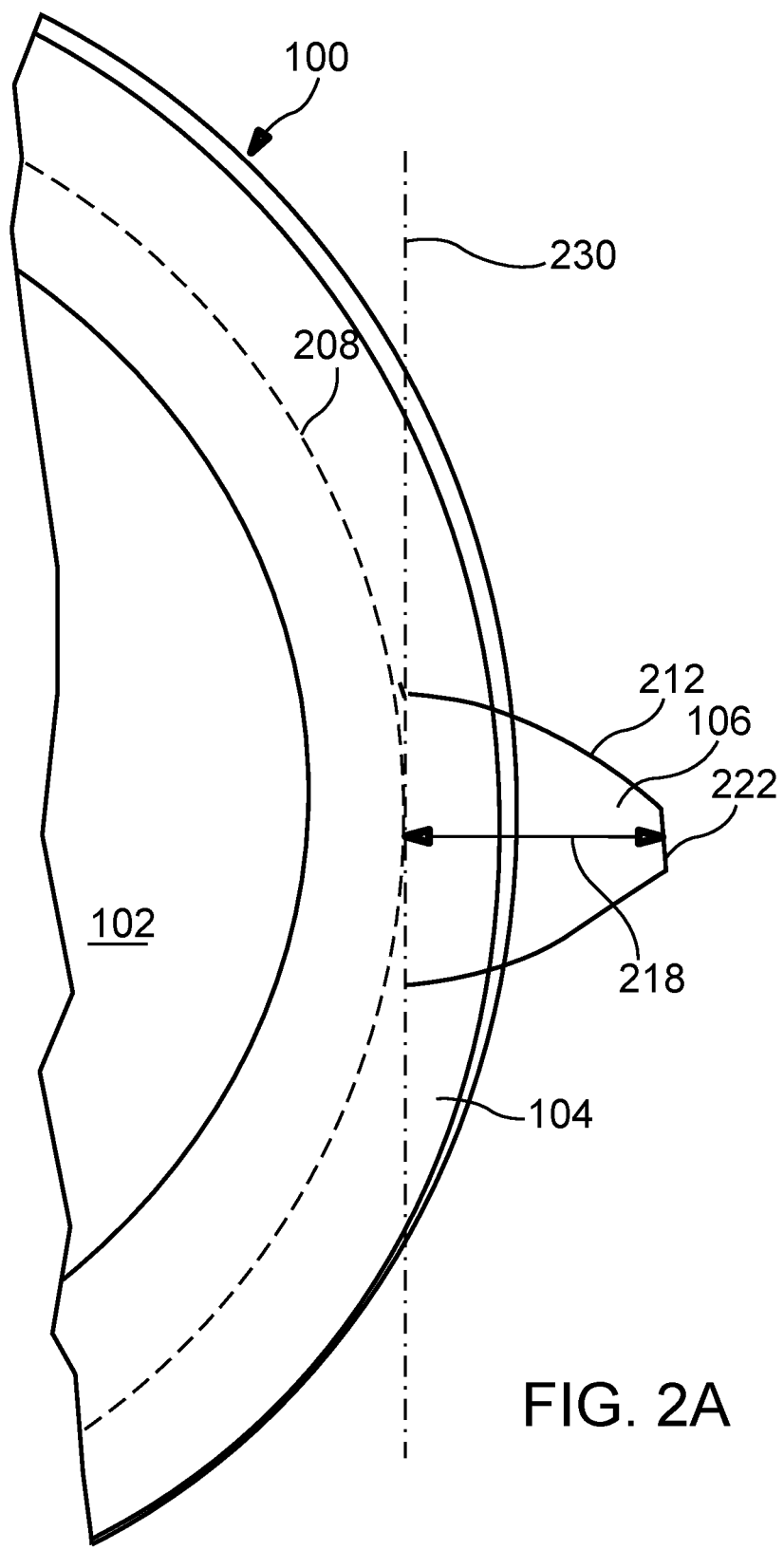

FIGS. 2A-2E illustrate the manner in which the shape of a gear tooth 106 is defined for the involute gear 100 in accordance with an embodiment. FIG. 2A shows a top view of a cut-away portion of the inner region 102 and the outer region 104 of the involute gear 100. An imaginary circle 208 is defined in the outer region 104. The imaginary circle is concentric with the involute gear 100 and encloses the inner region 102.

Each gear tooth 106 of the involute gear 100 is disposed along the imaginary circle 208. The outer shape of the gear tooth 106 may be defined starting from an involute outer profile 212 which is shown in a plane parallel to the surface of the inner region 102 and extending outward from the center of the gear.

Figure 2B:
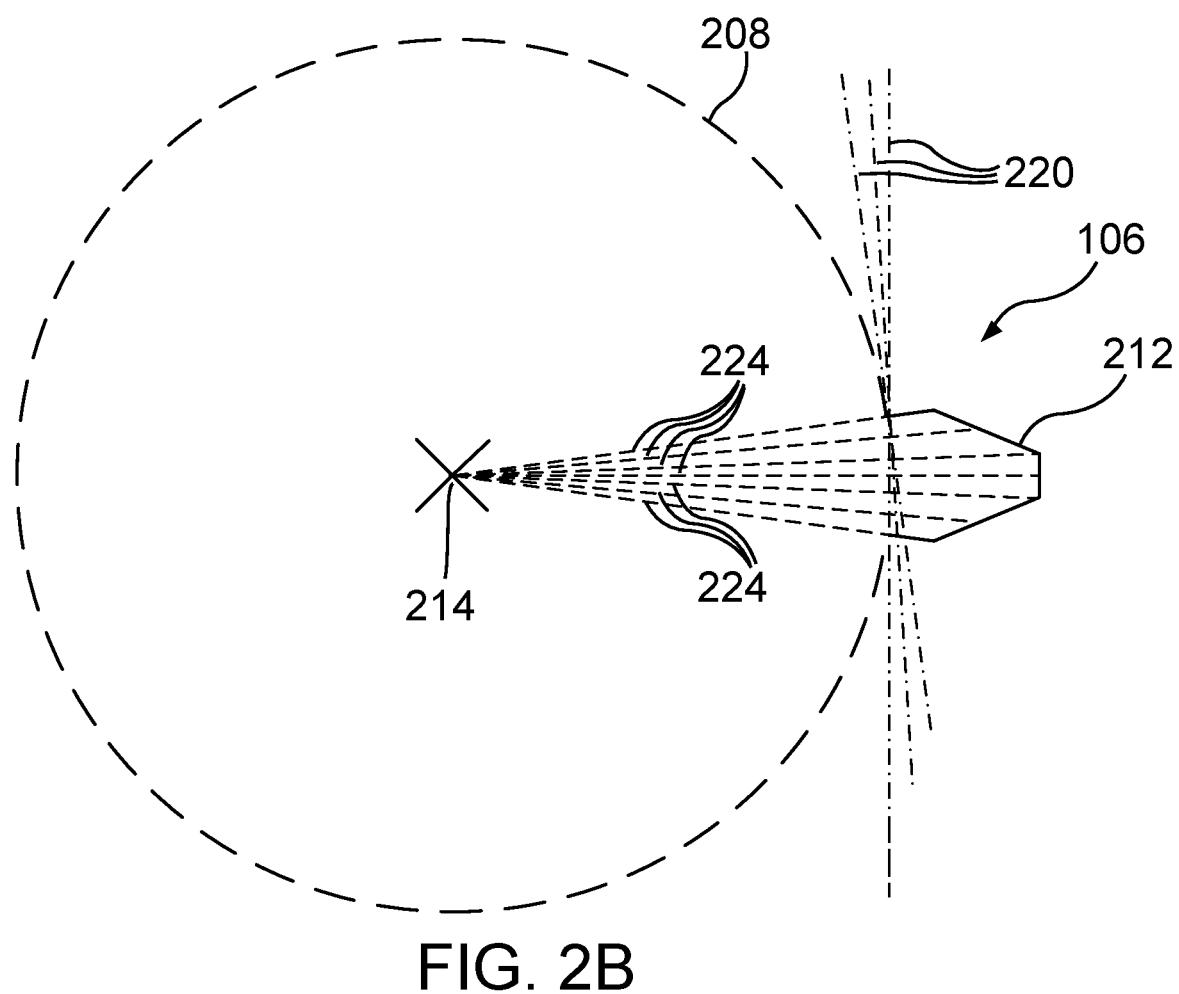

For each location on the involute outer profile 212, a corresponding imaginary ray 224 may be drawn from the center 214 of the gear to that location on the involute outer profile 212. FIG. 2B shows examples of the imaginary rays 224. Also, for each location on the involute outer profile 212, a corresponding axis 220 is shown which is both tangential to the imaginary circle 208 and perpendicular to its corresponding imaginary ray 224.

Figure 2C:
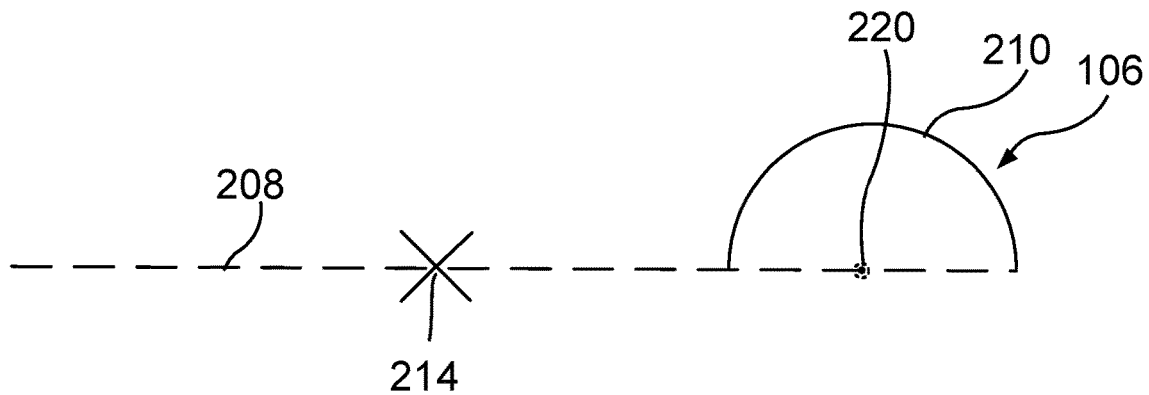

To define the outer profile of the gear tooth 106, each location on the involute outer profile 212 is rotated about its corresponding axis 220 while traversing a path defined by its corresponding imaginary ray 224. FIG. 2C shows an example of one such location on the involute outer profile 212 being rotated about its corresponding axis 220 in this manner. Though a rotation of 180° about the axis 220 is shown, the angle of rotation may be any value greater or less than 180°. For example, a rotation of 90° about the axis 220 is sufficient to allow for a 180° range of gearing angles.

Figure 2D:
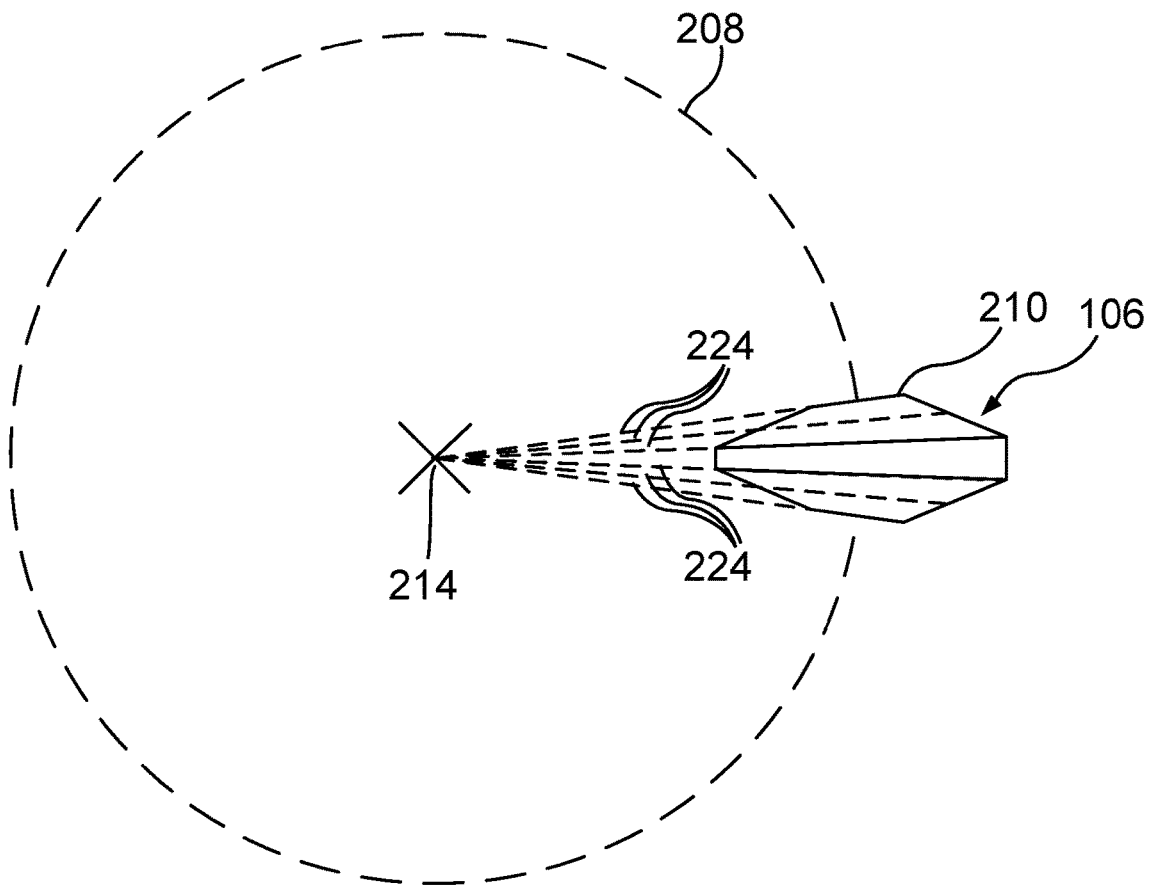
Figure 2E:
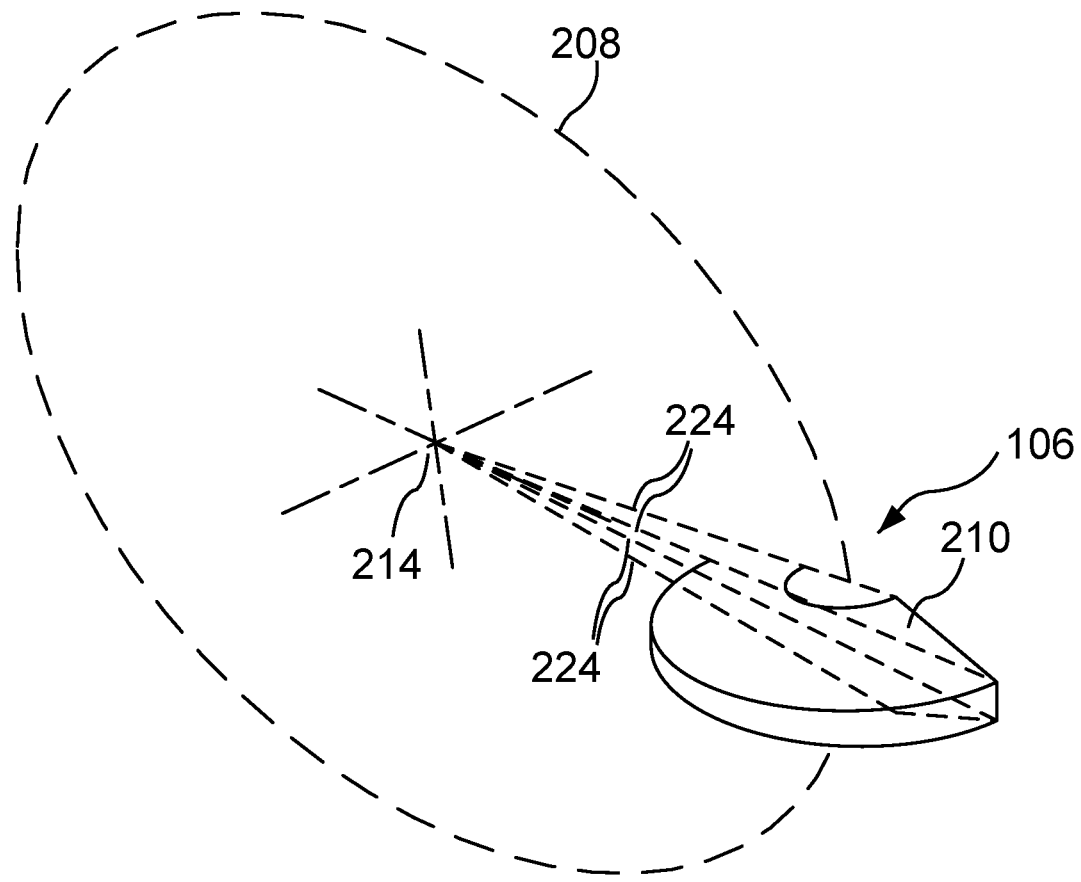

FIG. 2D shows a top view of the gear tooth 106 after each location on the involute outer profile 212 is rotated in the above-described manner, and FIG. 2E shows a side view of the gear tooth. Though the gear tooth is depicted as being formed of straight line segments, a curved involute profile will generate a gear tooth having curved walls.

FIGS. 3A-3B depict another example of a gear tooth 306 in which the outer shape of the gear tooth 306 is defined by a 360° rotation of each location on the involute outer profile 212 in the above manner. Alternatively, the gear tooth may be defined another range of rotation about the axis and provide a different range of gearing angles.

FIG. 4 shows a top view of the gear tooth 106 formed by rotation in the manner described above. Though a bevel-shaped gear tooth is depicted, other involute shapes are also within the scope of the embodiment including more rounded shapes.

FIGS. 5A-5B depict a front view of an arrangement of a pair of involute gears in accordance with an embodiment. Referring to FIG. 5A, the first involute gear 100 shown in FIG. 1 is depicted meshed with a second involute gear 102 in which the outer shape of each gear tooth 126 is defined in a manner similar to that of each gear tooth 106 of the first involute gear 100. Namely, each gear tooth 126 is defined by rotating an involute outer profile about an axis in the manner described above in connection with FIGS. 2A-2D and 3A-3B.

The second involute gear 120 includes a circular base 128 having an inner region 122 and an outer region 124 which comprise a first surface 130 of the second involute gear 120. Extending from the outer region 124 of the surface 130 are the plurality of gear teeth 126, each of which extends upwards, in part, and outwards, in part, from the surface. Though the first involute gear 100 and the second involute gear 120 are shown having a same diameter, other embodiments having first and second involute gears of unequal diameters are also within the scope of the disclosure.

FIG. 5B is a close-up view of a portion of the meshed first and second involute gears 100 and 102 shown in FIG. 5A. Particularly, the gear teeth 106 and 126 are shown in close up.

Additionally, in FIG. 5A, the first and second involute gears 100 and 102 are arranged with the first surfaces of the gears disposed in a same plane, that is, at a 180° gearing intersection angle. However, in accordance with the embodiment, the first and second involute gears 100 and 102 are able to mesh with each other at any of a range of angles.

FIGS. 6A-6B illustrate another arrangement of the pair of involute gears 100, 120 shown in FIGS. 5A-5B in which the gear teeth 106 and 126 of the involute gears 100 and 120, respectively, are meshed at another angle within the 180° range of gearing angles. FIG. 6A also shows the cross-sections 622 and 624 of the gear teeth 106 and 126, respectively, when meshed at the depicted gearing angle. In accordance with an embodiment, the involute gear 100 is rotatable about a pivot 230a which is tangential to the imaginary circle 208 of the involute gear 100, and the involute gear 120 is rotatable about a pivot 230b which is tangential to an imaginary circle (not shown) of the involute gear 120 and parallel to the pivot 230a. FIG. 6B is a close-up view of the respective cross-sections 622 and 624 of the gear teeth 106 and 126 shown in FIG. 6A.

FIG. 7 show a further arrangement of the pair of involute gears 100, 120 in which the gear teeth 106 and 126 are meshed at yet another angle within the 180° range of gearing angles. FIG. 7 also illustrates an example of the conditions by which the involute gears 100, 120 mesh at a range of angles. Specifically, a distance from the pivot 230a associated with the involute gear 100 to the pivot 230b associated with the involute gear 120 is fixed. For example, the distance from the pivot 230a to the pivot 230b may be twice the distance from each pivot 230a or 230b to the addendum of their associated gears. Further, a first angle 706 formed between the inner region 102 of the surface 110 of the gear 100 and a mid-plane 710 perpendicular to and bisecting a distance from the pivot 230a to the pivot 230b, and a second angle 716 formed between the inner region 122 of the surface 130 of the gear 120 and the mid-plane 170, each have a same value.

As depicted above, FIGS. 5A-5B show the involute gears 100, 120 meshing at a gearing intersection angle of 180° wherein the above conditions are met. Moreover, when the above conditions are met, the involute gears 100, 120 mesh at other gearing intersection angles as depicted in FIGS. 6A-6B and 7.

FIG. 8 shows a side view of an arrangement of the involute gears 100, 120 meshing at still another gearing angle, and FIG. 9 shows a side view of an arrangement of the involute gears 100, 120 meshing at a gearing angle of 0°.

FIG. 10 shows a front perspective view of an example of a bracket system 1000 in accordance with an embodiment. The bracket system 1000 may be used, for example, to enable a mounted first roller shade to drive an adjacently mounted roller shade at any of a range of angles between the two roller shades.

The bracket system 1000 incorporates, for example, the involute gears 100 and 120 described above which are rotatably mounted to brackets 1010 and 1020, respectively. The bracket 1010 may include a gear mounting portion 1012 and a wall mounting portion 1014 and is pivotally mounted about a pivot element 1016 to a back plate 1030. The bracket 1020 may include a gear mounting portion 1022 and a wall mounting portion 1024 and is pivotally mounted about a pivot element 1026 to the back plate 1030. The spacing of the pivots 1016 and 1026, and the angle relations of the surfaces of the involute gears 100 and 120 with a mid-plane (not shown) between pivots 1016 and 1026 comply with the conditions described above in connection with FIG. 7 so that the involute gears 100 and 120 can mesh at any of a range of gearing intersection angles about the pivots 1016 and 1026. For example, FIG. 10 shows the involute gears 100 and 120 meshing at an acute angle.

FIG. 11 shows a top perspective view of the bracket system 1000 arranged at the acute angle shown in FIG. 10.

FIG. 12 shows a front perspective view of an example of the bracket system 1000 of FIG. 10 in which the involute gears 100 and 120 mesh at a 180° gearing intersection angle, and FIG. 13 shows a top view of the bracket system 1000 arranged at the gearing intersection angle.

FIG. 14 shows a top perspective view of the bracket system 1000 in which the involute gears 100 and 120 mesh at a gearing intersection angle of 0°.

FIG. 15 depicts a back perspective view of the bracket system 1000 with the involute gears 100 and 102 meshing at a 180° gearing intersection angle. FIG. 15 also shows the rotation mounts 1040 and 1042 into which the involute gears 100 and 102 are respectively mounted in the brackets 1010 and 1020. Openings 1044 and 1046 are defined in the back side of the involute gears 100 and 102, respectively, at the center of the gears and are configured to receive an end of a roller shade or other element that is to be rotatably driven by the gears. Though hexagonal openings are shown, other shapes are also suitable and within the scope of the embodiment.

FIG. 16 depicts a back perspective view of the bracket system 1000 and shows the involute gears 100 and 102 meshing at another gearing intersection angle.

FIGS. 17-20 illustrate an example of a window shade system 1700 which incorporates the mounting bracket 1000 shown in FIGS. 10-16. The mounting bracket 1000 interconnects a first window shade 1712 with a second window shade 1732 such that a motor (not shown) driving one of the first and second window shades also drives the other of the first and second window shades regardless of the angle formed between the involute gears of the mounting bracket 1000. As a result, when the motor drives one of the first and second window shades to roll up that shade, the other shade concurrently rolls ups, and when the motor drives one of the first and second window shades to roll down that shade, the other shade concurrently rolls down. Though only two window shades are shown, additional shades may be driven by the same motor using additional mounting brackets 1000 to a further widow shade to one of the first and second window shades.

FIGS. 17A-17B depict front perspective view of the example of the window shade system 1700. A first window frame 1701 is disposed adjacent to a second window frame 1720. The first and second window frames are disposed at an angle with respect to each other. Though the two window frames are shown arranged at an acute angle between them, the two window frames may be arranged any of a range of angles, including being arranged in the same plane (a 180° angle) or at a 90° angle.

A window shade roller 1710 of the first window shade 1712 is rotatably attached to a window frame head 1702 of the first window frame 1701. The window shade roller 1710 is rotatably coupled at one end to an end bracket 1714 which is in turn affixed to the window frame head 1702 of the first window frame 1701. The window shade roller 1710 is attached at another end to an involute gear of the mounting bracket 1000.

A window shade roller 1730 of the second window shade 1732 is rotatably attached to a window frame head 1722 of the second window frame 1720. The window shade roller 1730 is rotatably attached at one end to an end bracket 1734 which is in turn affixed to the window frame head 1722 of the second window frame 1720. The window shade roller 1730 is attached at another end to another involute gear of the mounting bracket 1000.

FIG. 17B shows in greater detail the mounting bracket 1000 depicted in FIG. 17A together with cut-away portions of the window frame heads 1702 and 1722 and of the window shade rollers 1710 and 1730. In FIG. 17B, like reference numerals to those of FIGS. 10-16 identify same parts of the mounting bracket 1000. The top wall 1028 of the second plate 1020 of the mounting bracket 1000 is affixed to the window frame head 1702 of the first window frame 1701. The wall mounting portion 1024 of the second plate 1020 may also be attached to another surface of the first window frame 1701. The top wall 1018 of the first plate 1010 of the mounting bracket 1000 is affixed to the window frame head 1722 of the second window frame 1720. The wall mounting portion 1014 of the first plate 1012 may also be attached to another surface of the second window frame 1720.

When one of the window shade rollers 1710, 1730 of the first window and second shades 1712, 1731 is rotated, such as using a motor (not shown), the end connected to one of the involute gears of the mounting bracket 1000 similarly rotates and causes the other involute gear to rotate, which in turn rotates the window shade roller attached to that involute gear. In this manner, a motor driving one of the window shades may be used to drive one or more additional roller shades.

FIG. 18A shows a frontal perspective view from above of the window shade system 1700 depicted in FIG. 17A. FIG. 18B shows in greater detail the mounting bracket 1000 as depicted in FIG. 18A together with cut-away portions of the window frame heads 1702 and 1722 and of the window shade rollers 1710 and 1730.

FIG. 19A shows a frontal perspective view from below of the window shade system 1700 depicted in FIG. 17A. FIG. 19B shows in greater detail the mounting bracket 1000 as depicted in FIG. 19A together with cut-away portions of the window frame heads 1702 and 1722 and of the window shade rollers 1710 and 1730.

FIG. 20 shows a bottom perspective view of the window shade system 1700 depicted in FIG. 17A.

In each of FIGS. 17A-17B, 18A-18B, 19A-19B and 20, like reference numerals identify like parts.

Because the mounting bracket 1000 is operable any of a range of gear angles, such as from 0° to 180°, the mounting bracket 1000 is suitable for use with adjacent windows at any of a corresponding range of angles. Therefore, the need for providing specific gear arrangements designed only for a specific gear angle is eliminated.

INDUSTRIAL APPLICABILITY

To solve the aforementioned problems, the present embodiments provide an involute gear system and bracket system which permit adjacent motorized roller shades to be driven by a single motor regardless of the angle between the adjacent roller shades.

Alternate Embodiments

Alternate embodiments may be devised without departing from the spirit or the scope of the embodiments.

What is claimed is:

1. A window shade system, comprising:
   (a) a first bracket having a window frame mounting portion attachable to a first window frame, and a receiving portion;
   (b) a second bracket having a window frame mounting portion attachable to a second window frame, and a receiving portion;
   (c) first and second gears, each including:
      (i) a circular base having a front surface that includes an inner region and an outer region that surrounds the inner region, and a rear surface having an opening for receiving an end of a window shade roller of a window shade, the circular base being rotatable about a central axis; and
      (ii) a plurality of gear teeth arranged in a same row and extending outward from the outer region of the front surface and being evenly spaced from each other along a plurality of locations on the outer region of the surface, each gear tooth having a cross-sectional width that decreases with decreasing distance from the central axis of that gear, and having a shape that permits any one of the gear teeth in the row of gear teeth of the first gear to contact and directly mesh with any one of the gear teeth in the row of gear teeth of the second gear for any gear angle within a predefined range of gear angles between the central axis of the first gear and the central axis of the second gear;
   (d) the first bracket being coupled to a first pivot and being rotatable about the first pivot at least within a first range of angles, the first gear being rotatably coupled to the receiving portion of the first bracket such that the first gear and a first window shade roller are rotatable about the central axis of the first gear, the first pivot being located at a first distance from the central axis of the first gear; and
   (e) the second bracket being coupled to a second pivot and rotatable about the second pivot at least within a second range of angles, the second gear being rotatably coupled to the receiving portion of the second bracket such that the second gear and a second window shade roller are rotatable about the central axis of the second gear, the second pivot being located at a second distance from the central axis of the second gear; and
   (f) the first and second pivots being arranged relative to each other and relative to the central axes of the first and second gears, respectively, such that for any angle within the first range of angles, such arrangement of the first and second pivots combine with the shape of the gear teeth of the first and second gears to permit at least one gear tooth in the row of gear teeth of the first gear to contact and directly mesh with at least one gear tooth in the row of gear teeth of the second gear at a corresponding angle within the second range of angles.

2. The window shade system of claim 1, wherein the first pivot is located at a first distance from the central axis of the first gear,
   (b) the second pivot is located at a second distance from the central axis of the second gear and is parallel to the first pivot, and
   (c) a first angle formed between the inner region of the surface of the first gear and a mid-plane perpendicular to and bisecting an imaginary line extending from the first pivot to the second pivot, and a second angle formed between the inner region of the front surface of the second gear and the mid-plane, each have a same value, so that for any angle within the first range of angles, such arrangement of the first and second brackets combine with the shape of the gear teeth of the first and second gears to permit the at least one gear tooth in the row of gear teeth of the first gear to contact and directly mesh with the at least one gear tooth in the row of gear teeth of the second gear at a corresponding angle within the second range of angles.

3. The window shade system of claim 1, wherein the first bracket and the second bracket are interconnected such that movement of the first bracket about the first pivot causes a corresponding movement of the second bracket about the second pivot.

4. The window shade system of claim 1, further comprising:
   a back plate coupled to the first bracket at the first pivot such that the first bracket is movable about the first pivot and coupled to the second bracket at the second pivot such that the second bracket is movable about the second pivot.

5. The window shade system of claim 1, wherein
   (a) the shape of each gear tooth of the first and second gears is defined by independently rotating each one of a plurality of locations on a starting profile associated with that gear tooth, the starting profile being initially disposed in a reference plane that is perpendicular to the central axis of the circular base and extending outward from the central axis of the circular base.

6. The window shade system of claim 5, wherein
   (a) using a common reference circle that is concentric with the central axis and located in the reference plane, and using a plurality of imaginary rays that are located in the reference plane, each one of the plurality of imaginary rays being respectively associated with a corresponding one of the plurality of locations on the starting profile, and extending from the central axis of the circular base to its corresponding location on the starting profile,
      (i) a plurality of axes of rotation is defined that are respectively associated with the corresponding ones of the plurality of locations on the starting profile, each axis of rotation being tangential to the reference circle at the intersection of its corresponding imaginary ray with the reference circle, and
      (ii) each location on the starting profile is rotated out of the reference plane about its corresponding axis of rotation while its distance from the corresponding axis of rotation remains fixed.

7. The window shade system of claim 6, wherein
   (a) the respective paths traversed by the plurality of locations on the starting profile combine to define the shape of the gear tooth and become closer to each other as the plurality of locations are rotated such that the cross-sectinal width of that gear tooth decreases with decreasing distance from the axis of rotation.

8. The window shade system of claim 6, wherein
   (a) the first pivot is tangential to the common reference circle of the first gear, and
   (b) the second pivot is tangential to the common reference circle of the second gear.

9. The window shade system of claim 5, wherein (a) the starting profile is an involute profile.

10. A window shade system, comprising:
   (a) a back plate;
   (b) a first bracket coupled to the back plate at a first pivot and having a window frame mounting portion attachable to a first window frame, and a receiving portion;
   (c) a second bracket coupled to the back plate at a first pivot and having a window frame mounting portion attachable to a second window frame, and a receiving portion;
   (d) first and second gears, each including:
      a circular base having a surface that includes an inner region and an outer region that surrounds the inner region, and a rear surface having an opening for receiving an and of a window shade roller of a window shade, the circular base being rotatable about a central axis; and
      (ii) a plurality of gear teeth arranged in a same row and extending outward from the outer region of the front surface and being evenly spaced from each other along a plurality of locations on the outer region of the surface, each gear tooth having a cross-sectional width that decreases with decreasing distance from the central axis of the gear, and having a shape that permits any one of the gear teeth in the row of gear teeth of the fist gear to contact and directly mesh with any one of the gear teeth in the row of gear teeth of the second gear for any gear angle within a pre-defined range of gear angels between the central axis of the first gear and the central axis of the second gear;
   (e) the first bracket being rotatable about the first pivot at least within a first range of angles, the first gear being rotatably coupled to the receiving portion of the first bracket such that the first gear and a first window shade roller are rotatable about the central axis of the first gear, the first pivot being located at a first distance from the central axis of the first gear; and
   (f) the second bracket being rotatable about the second pivot at least within a second range of angles, the second gear being rotatably coupled to the receiving portion of the second bracket such that the second gear and a second window shade roller are rotatable about the central axis of the second gear, the second pivot being located at a second distance from the central axis of the second gear; and
   (g) wherein the first pivot is located at a first distance from the central axis of the first gear, the second pivot is located at a second distance from the central axis of the second gear and is parallel to the first pivot, and the first bracket and the second bracket are interconnected such that a first angle formed between the inner region of the surface of the first gear and a mid-plane perpendicular to and bisecting an imaginary line extending from the first pivot to the second pivot, and a second angle formed between the inner region of the surface of the second gear and the mid-plane, each have a same value, so that for any angle within the first range of angles, such arrangement of the first and second brackets combine with the shape of the gear teeth of the first and second gears to permit the at least one gear tooth in the row of gear teeth of the first gear to contact and directly mesh with the at least one gear tooth in the row of gear teeth of the second gear at a corresponding angle within the second range of angles.

11. A window shade system, comprising:
   (a) a first bracket having a window frame mounting portion attachable to a first window frame, and a receiving portion;
   (b) a first gear, including:
      (i) a first circular base having a front surface that includes an inner region and an outer region that surrounds the inner region, and a rear surface having an opening for receiving an end of a window shade roller of a first window shade, the first circular base being rotatable about a first central axis, and
      (ii) a plurality of gear teeth arranged in a same row and extending outward from the outer region of the front surface and being evenly spaced from each other along a plurality of locations on the outer region of the surface, each gear tooth having a cross-sectional width that decreases with decreasing distance from the first central axis,
(c) the first bracket being coupled to a first pivot and being rotatable about the first pivot at least within a first range of angles, the first gear being rotatably coupled to the receiving portion of the first bracket such that the first gear and a first window shade roller are rotatable about the central axis of the first gear, the first pivot being located at a first distance from the central axis of the first gear;
(d) a second bracket having a window frame mounting portion attachable to a second window frame, and a receiving portion;
(e) a second gear, including:
  (i) a second circular base having a front surface that includes an inner region and an outer region that surrounds the inner region, and a rear surface having an opening for receiving an end of a window shade roller of a second window shade, the circular base being rotatable about a second central axis, and
  (ii) a plurality of gear teeth arranged in a same row and extending outward from the outer region of the front surface and being evenly spaced from each other along a plurality of locations on the outer region of the surface, each gear tooth having a cross-sectional width that decreases with decreasing distance from the second central axis;
(f) the second bracket being coupled to a second pivot and being rotatable about the second pivot at least within a second range of angles, the second gear being rotatably coupled to the receiving portion of the second bracket such that the second gear and a second window shade roller are rotatable about the central axis of the second gear, the second pivot being located at a second distance from the central axis of the second gear; and
(g) the plurality of gear teeth of the first gear and the plurality of gear teeth of the second gear each having a shape that permits any one of the gear teeth in the row of gear teeth of the first gear to contact and directly mesh with any one of the gear teeth in the row of gear teeth of the second gear for any gear angle within a predefined range of gear angles between the first central axis and the second central axis; and
(h) the first and second pivots being arranged relative to each other and relative to the central axes of the first and second gears, respectively, such that for any angle within the first range of angles, such arrangement of the first and second pivots combine with the shape of the gear teeth of the first and second gears to permit at least one gear tooth in the row of gear teeth of the first gear to contact and directly mesh with at least one gear tooth in the row of gear teeth of the second gear at a corresponding angle within the second range of angles.

* * * * *